US007340572B2

(12) United States Patent
Cochran

(10) Patent No.: US 7,340,572 B2
(45) Date of Patent: Mar. 4, 2008

(54) METHOD AND SYSTEM FOR RELIABLE REMOTE-MIRROR RESYNCHRONIZATION IN DISK ARRAYS AND OTHER MASS STORAGE DEVICES

(75) Inventor: Robert A. Cochran, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1364 days.

(21) Appl. No.: 10/094,827

(22) Filed: Mar. 6, 2002

(65) Prior Publication Data

US 2003/0170012 A1   Sep. 11, 2003

(51) Int. Cl.
*G06F 12/16* (2006.01)
(52) U.S. Cl. .................... 711/162; 711/114; 710/39
(58) Field of Classification Search ............ 711/114, 711/161, 162; 710/39
See application file for complete search history.

(56) References Cited

U.S. PATENT DOCUMENTS 6,338,126 B1 *  1/2002  Ohran et al. .............. 711/162
6,842,835 B1 *  1/2005  Fujimoto et al. .......... 711/162

* cited by examiner

Primary Examiner—Jack Lane

(57) ABSTRACT

On a dominant logical unit provided by a mass-storage device, hot spare disks are employed to create a much larger, disk-based time-ordered WRITE-request buffer that spans, in one embodiment, both electronic memory and hot spare disks. The much larger time-ordered WRITE-request buffer in the modified dominant logical unit allows for storing WRITE requests in time order for a much longer period of time during communications failure between the dominant logical unit and remote-mirror logical unit than in the current techniques that employ only an electronic-memory-based time-ordered WRITE-request buffer. On the remote-mirror logical unit, mass-storage space is provided for an alternate logical unit that can be resynchronized with the dominant logical unit following restoration of communications between the dominant logical unit and remote-mirror logical unit. When resynchronization is complete, a simple logical-unit-pointer switch operation can be employed to designate the alternate logical unit as the new remote-mirror logical unit, and the previous remote-mirror logical unit as the alternate logical unit.

21 Claims, 18 Drawing Sheets

METHOD AND SYSTEM FOR RELIABLE REMOTE-MIRROR RESYNCHRONIZATION IN DISK ARRAYS AND OTHER MASS STORAGE DEVICES

TECHNICAL FIELD

The present invention relates to the mirroring of logical units provided by a disk array or other mass-storage device and, in particular, to a method and system for continuing operation of a dominant logical unit provided by a dominant mass-storage device following interruption of communications between the dominant mass-storage device and a remote mass-storage device that provides a remote-mirror logical unit and for re-synchronizing the data states of the dominant and remote-mirror logical units following restoration of communications between the dominant mass-storage device and a remote mass-storage device.

BACKGROUND OF THE INVENTION

The present invention is related to mirroring of data contained in a dominant logical unit of a dominant mass-storage device on a remote-mirror logical unit provided by a remote mass-storage device. An embodiment of the present invention, discussed below, involves disk-array mass-storage devices. To facilitate that discussion, a general description of disk drives and disk arrays is first provided.

The most commonly used non-volatile mass-storage device in the computer industry is the magnetic disk drive. In the magnetic disk drive, data is stored in tiny magnetized regions within an iron-oxide coating on the surface of the disk platter. A modern disk drive comprises a number of platters horizontally stacked within an enclosure. The data within a disk drive is hierarchically organized within various logical units of data. The surface of a disk platter is logically divided into tiny, annular tracks nested one within another. FIG. 1A illustrated tracks on the surface of a disk platter. Note that, although only a few tracks are shown in FIG. 1A, such as track 101, an actual disk platter may contain many thousands of tracks. Each track is divided into radial sectors. FIG. 1B illustrates sectors within a single track on the surface of the disk platter. Again, a given disk track on an actual magnetic disk platter may contain many tens or hundreds of sectors. Each sector generally contains a fixed number of bytes. The number of bytes within a sector is generally operating-system dependent, and normally ranges from 512 bytes per sector to 4096 bytes per sector. The data normally retrieved from, and stored to, a hard disk drive is in units of sectors.

The modem disk drive generally contains a number of magnetic disk platters aligned in parallel along a spindle passed through the center of each platter. FIG. 2 illustrates a number of stacked disk platters aligned within a modem magnetic disk drive. In general, both surfaces of each platter are employed for data storage. The magnetic disk drive generally contains a comb-like array with mechanical READ/WRITE heads 201 that can be moved along a radial line from the outer edge of the disk platters toward the spindle of the disk platters. Each discrete position along the radial line defines a set of tracks on both surfaces of each disk platter. The set of tracks within which ganged READ/WRITE heads are positioned at some point along the radial line is referred to as a cylinder. In FIG. 2, the tracks 202-210 beneath the READ/WRITE heads together comprise a cylinder, which is graphically represented in FIG. 2 by the dashed-out lines of a cylinder 212.

FIG. 3 is a block diagram of a standard disk drive. The disk drive 301 receives input/output ("I/O") requests from remote computers via a communications medium 302 such as a computer bus, fibre channel, or other such electronic communications medium. For many types of storage devices, including the disk drive 301 illustrated in FIG. 3, the vast majority of I/O requests are either READ or WRITE requests. A READ request requests that the storage device return to the requesting remote computer some requested amount of electronic data stored within the storage device. A WRITE request requests that the storage device store electronic data furnished by the remote computer within the storage device. Thus, as a result of a READ operation carried out by the storage device, data is returned via communications medium 302 to a remote computer, and as a result of a WRITE operation, data is received from a remote computer by the storage device via communications medium 302 and stored within the storage device.

The disk drive storage device illustrated in FIG. 3 includes controller hardware and logic 303 including electronic memory, one or more processors or processing circuits, and controller firmware, and also includes a number of disk platters 304 coated with a magnetic medium for storing electronic data. The disk drive contains many other components not shown in FIG. 3, including READ/WRITE heads, a high-speed electronic motor, a drive shaft, and other electronic, mechanical, and electromechanical components. The memory within the disk drive includes a request/reply buffer 305, which stores I/O requests received from remote computers, and an I/O queue 306 that stores internal I/O commands corresponding to the I/O requests stored within the request/reply buffer 305. Communication between remote computers and the disk drive, translation of I/O requests into internal I/O commands, and management of the I/O queue, among other things, are carried out by the disk drive I/O controller as specified by disk drive I/O controller firmware 307. Translation of internal I/O commands into electromechanical disk operations in which data is stored onto, or retrieved from, the disk platters 304 is carried out by the disk drive I/O controller as specified by disk media read/write management firmware 308. Thus, the disk drive I/O control firmware 307 and the disk media read/write management firmware 308, along with the processors and memory that enable execution of the firmware, compose the disk drive controller.

Individual disk drives, such as the disk drive illustrated in FIG. 3, are normally connected to, and used by, a single remote computer, although it has been common to provide dual-ported disk drives for concurrent use by two computers and multi-host-accessible disk drives that can be accessed by numerous remote computers via a communications medium such as a fibre channel. However, the amount of electronic data that can be stored in a single disk drive is limited. In order to provide much larger-capacity electronic data-storage devices that can be efficiently accessed by numerous remote computers, disk manufacturers commonly combine many different individual disk drives, such as the disk drive illustrated in FIG. 3, into a disk array device, increasing both the storage capacity as well as increasing the capacity for parallel I/O request servicing by concurrent operation of the multiple disk drives contained within the disk array.

FIG. 4 is a simple block diagram of a disk array. The disk array 402 includes a number of disk drive devices 403, 404, and 405. In FIG. 4, for simplicity of illustration, only three individual disk drives are shown within the disk array, but disk arrays may contain many tens or hundreds of individual disk drives. A disk array contains a disk array controller 406 and cache memory 407. Generally, data retrieved from disk drives in response to READ requests may be stored within the cache memory 407 so that subsequent requests for the same data can be more quickly satisfied by reading the data from the quickly accessible cache memory rather than from the much slower electromechanical disk drives. Various elaborate mechanisms are employed to maintain, within the cache memory 407, data that has the greatest chance of being subsequently re-requested within a reasonable amount of time. The disk WRITE requests, in cache memory 407, in the event that the data may be subsequently requested via READ requests or in order to defer slower writing of the data to physical storage medium.

Electronic data is stored within a disk array at specific addressable locations. Because a disk array may contain many different individual disk drives, the address space represented by a disk array is immense, generally many thousands of gigabytes. The overall address space is normally partitioned among a number of abstract data storage resources called logical units ("LUNs"). A LUN includes a defined amount of electronic data storage space, mapped to the data storage space of one or more disk drives within the disk array, and may be associated with various logical parameters including access privileges, backup frequencies, and mirror coordination with one or more LUNs. LUNs may also be based on random access memory ("RAM"), mass-storage devices other than hard disks, or combinations of memory, hard disks, and/or other types of mass-storage devices. Remote computers generally access data within a disk array through one of the many abstract LUNs 408-415 provided by the disk array via internal disk drives 403-405 and the disk array controller 406. Thus, a remote computer may specify a particular unit quantity of data, such as a byte, word, or block, using a bus communications media address corresponding to a disk array, a LUN specifier, normally a 64-bit integer, and a 32-bit, 64-bit, or 128-bit data address that specifies a LUN, and a data address within the logical data address partition allocated to the LUN. The disk array controller translates such a data specification into an indication of a particular disk drive within the disk array and a logical data address within the disk drive. A disk drive controller within the disk drive finally translates the logical address to a physical medium address. Normally, electronic data is read and written as one or more blocks of contiguous 32-bit or 64-bit computer words, the exact details of the granularity of access depending on the hardware and firmware capabilities within the disk array and individual disk drives as well as the operating system of the remote computers generating I/O requests and characteristics of the communication medium interconnecting the disk array with the remote computers.

In many computer applications and systems that need to reliably store and retrieve data from a mass-storage device, such as a disk array, a primary data object, such as a file or database, is normally backed up to backup copies of the primary data object on physically discrete mass-storage devices or media so that if, during operation of the application or system, the primary data object becomes corrupted, inaccessible, or is overwritten or deleted, the primary data object can be restored by copying a backup copy of the primary data object from the mass-storage device. Many different techniques and methodologies for maintaining backup copies have been developed. In one well-known technique, a primary data object is mirrored. FIG. 5 illustrates object-level mirroring. In FIG. 5, a primary data object "$O_3$" 501 is stored on LUN A 502. The mirror object, or backup copy, "$O_3$" 503 is stored on LUN B 504. The arrows in FIG. 5, such as arrow 505, indicate I/O write operations directed to various objects stored on a LUN. I/O write operations directed to object "$O_3$" are represented by arrow 506. When object-level mirroring is enabled, the disk array controller providing LUNs A and B automatically generates a second I/O write operation from each I/O write operation 506 directed to LUN A, and directs the second generated I/O write operation via path 507, switch "$S_1$" 508, and path 509 to the mirror object "$O_3$" 503 stored on LUN B 504. In FIG. 5, enablement of mirroring is logically represented by switch "$S_1$" 508 being on. Thus, when object-level mirroring is enabled, any I/O write operation, or any other type of I/O operation that changes the representation of object "$O_3$" 501 on LUN A, is automatically mirrored by the disk array controller to identically change the mirror object "$O_3$" 503. Mirroring can be disabled, represented in FIG. 5 by switch "$S_1$" 508 being in an off position. In that case, changes to the primary data object "$O_3$" 501 are no longer automatically reflected in the mirror object "$O_3$" 503. Thus, at the point that mirroring is disabled, the stored representation, or state, of the primary data object "$O_3$" 501 may diverge from the stored representation, or state, of the mirror object "$O_3$" 503. Once the primary and mirror copies of an object have diverged, the two copies can be brought back to identical representations, or states, by a resync operation represented in FIG. 5 by switch "$S_2$" 510 being in an on position. In the normal mirroring operation, switch "$S_2$" 510 is in the off position. During the resync operation, any I/O operations that occurred after mirroring was disabled are logically issued by the disk array controller to the mirror copy of the object via path 511, switch "$S_2$," and pass 509. During resync, switch "$S_1$" is in the off position. Once the resync operation is complete, logical switch "$S_2$" is disabled and logical switch "$S_1$" 508 can be turned on in order to reenable mirroring so that subsequent I/O write operations or other I/O operations that change the storage state of primary data object "$O_3$," are automatically reflected to the mirror object "$O_3$" 503.

FIG. 6 illustrates a dominant LUN coupled to a remote-mirror LUN. In FIG. 6, a number of computers and computer servers 601-608 are interconnected by various communications media 610-612 that are themselves interconnected by additional communications media 613-614. In order to provide fault tolerance and high availability for a large data set stored within a dominant LUN on a disk array 616 coupled to server computer 604, the dominant LUN 616 is mirrored to a remote-mirror LUN provided by a remote disk array 618. The two disk arrays are separately interconnected by a dedicated communications medium 620. Note that the disk arrays may be linked to server computers, as with disk arrays 616 and 618, or may be directly linked to communications medium 610. The dominant LUN 616 is the target for READ, WRITE, and other disk requests. All WRITE requests directed to the dominant LUN 616 are transmitted by the dominant LUN 616 to the remote-mirror LUN 618, so that the remote-mirror LUN faithfully mirrors the data stored within the dominant LUN. If the dominant LUN fails, the requests that would have been directed to the dominant LUN can be redirected to the mirror LUN without a perceptible interruption in request servicing. When operation of the dominant LUN 616 is restored, the dominant LUN 616 may become the remote-mirror LUN for the previous remote-mirror LUN 618, which becomes the new dominant LUN, and may be resynchronized to become a faithful copy of the new dominant LUN 618. Alternatively, the restored dominant LUN 616 may be brought up to the same data state as the remote-mirror LUN 618 via data copies from the remote-mirror LUN and then resume operating as the dominant LUN. Various types of dominant-LUN/remote-mirror-LUN pairs have been devised. Some operate entirely synchronously, while others allow for asynchronous operation and reasonably slight discrepancies between the data states of the dominant LUN and mirror LUN.

FIG. 7 schematically illustrates normal operation of a dominant LUN/remote-mirror-LUN pair. Data access requests, including READ and WRITE requests, such as data access request 701, are received from a communications medium by the controller 703 of the disk array 702 that provides the dominant LUN, or dominant disk array. The received data-access requests are routed by the controller 703 to a memory-based input queue 704 within the memory component 705 of the dominant disk array 702. The controller 703 also routes WRITE requests, such as WRITE request 706, through one or more dedicated communications links to the remote disk array 707 that provides the remote-mirror LUN. The controller 708 of the remote disk array routes the received WRITE requests to an input queue 709 within the memory component 710, from which the WRITE requests are later dequeued and written to appropriate disk drives within the remote disk array. Similarly, within the dominant LUN, disk-access requests are subsequently dequeued from the memory queue 704 and internally transmitted to the appropriate disk drives. In a synchronous dominant LUN/remote-mirror-LUN pair, a next WRITE operation is not dequeued and carried out by the dominant LUN until an acknowledgement is received from the remote-mirror LUN for the previous WRITE request forwarded to the remote-mirror LUN. Thus, the dominant LUN and remote-mirror LUN are kept in nearly identical data states. In an asynchronous dominant LUN/remote-mirror-LUN pair, WRITE requests may be carried out on the dominant LUN well before execution of the WRITE requests on the remote-mirror LUN. However, various techniques are employed in asynchronous dominant LUN/remote-mirror-LUN pairs to manage the data state disparity in order to ensure data integrity. Note that other types of requests and commands besides WRITE requests may alter the data state of a mass-storage device, and that, in this discussion, a WRITE request refers to any command or request that can alter the data state of a mass-storage device.

Occasionally, the dedicated communications link may fail. In certain cases, communication between the dominant LUN and the remote-mirror LUN may be redirected through alternate communications paths. However, in other cases, the dominant LUN may become isolated from the remote-mirror LUN, and WRITE operations received by the dominant LUN may not be transmitted by the dominant LUN to the remote-mirror LUN. FIG. 8 illustrates a communications failure within a dominant LUN/remote-mirror-LUN pair. In FIG. 8, the communications link 802 between the dominant disk array 702 and the remote disk array 707 has been broken, and the memory queue 709 within the memory component 710 of the remote disk array 707 is empty. Because WRITE requests cannot be forwarded from the dominant LUN to the remote-mirror LUN, the dominant LUN instead begins to accumulate the unforwarded WRITE requests in a buffer 804 within the memory component 705 of the dominant disk array 702. When the communications link between the dominant LUN and the remote-mirror LUN is restored, the dominant LUN can then forward the stored WRITE requests to the remote-mirror LUN in order to resynchronize the data states of the dominant LUN and remote-mirror LUN.

Two different types of WRITE-request buffers are generally employed to temporarily buffer WRITE requests during a communications failure. FIGS. 9A and 9B illustrate these two different types of WRITE-request buffers. Initially, the dominant LUN may store the unforwarded WRITE requests in a time-ordered WRITE-request buffer, illustrated in FIG. 9A. In the time-ordered WRITE-request buffer 902, unforwarded WRITE requests are stored in the order in which they are received and queued to the memory queue 704 in the memory component 705 of the dominant LUN. Alternatively, if WRITE requests are sequenced, by containing sequence numbers or other sequencing mechanisms, the WRITE requests may be stored in the time-ordered WRITE-request buffer 902 in their sequence order. Upon restoration of communication between the dominant LUN and the remote-mirror LUN, the WRITE requests can be extracted in first-in-first-out order ("FIFO") for transmission to the remote-mirror LUN.

Unfortunately, the amount of data that can be stored within the time-ordered WRITE-request buffer 902 is limited, and each WRITE request, such as WRITE request 904, must be stored in its entirety. The advantage of using a time-ordered WRITE-request buffer is that, upon resumption of communications between the dominant LUN and the remote-mirror LUN, the WRITE request can be straightforwardly extracted from the time-ordered WRITE-request buffer and forwarded to the remote-mirror LUN without risking corruption of the data stored on the remote-mirror LUN. In other words, WRITE-request forwarding from the dominant LUN to the remote-mirror LUN is delayed, but the sequence of forwarded WRITE requests is maintained.

If the communications link is not quickly restored, a time-ordered WRITE-request buffer is generally quickly exhausted, and the dominant LUN then commonly transitions to employing a WRITE-request bit-map buffer, as shown in FIG. 9B. In a WRITE-request bit-map buffer, each of a particular type of data storage units within the dominant LUN is represented within the WRITE-request bit-map buffer as a single bit. When the bit is set, the bit map indicates that that data storage unit has been written since communications between the dominant LUN and the remote-mirror LUN was last interrupted. A set bit may be called a "dirty bit" to flag dirty data storage units. Generally, either tracks or cylinders are employed as the logical data storage unit to represent with a single bit within the bit map, in order to keep the bit map reasonably sized while, at the same time, maintaining sufficient granularity so that copying only dirty data storage units to the remote-mirror LUN represents a distinct savings with respect to copying all data storage units to the remote-mirror LUN.

The WRITE-request bit-map buffer 906 is far more compact than a time-ordered WRITE-request buffer. Rather than storing the entire WRITE-request, including the data to be written, the WRITE-request bit-map buffer needs to maintain only a single bit for each track or cylinder to indicate whether or not the track or cylinder has been written since the communications link was broken. Unfortunately, the WRITE-request bit-map buffer does not maintain any WRITE-request sequence information. Thus, when the communications link is restored, and the data state of the remote-mirror LUN needs to be resynchronized with that of the dominant LUN, the remote-mirror LUN is generally in a potentially corrupt data state while tracks or cylinders indicated in the bit map are transferred from the dominant LUN to the remote-mirror LUN. This potentially corrupted data state arises because the sequence of WRITE operations received by the dominant LUN has not been preserved in the WRITE-request bit map.

FIGS. 10A-E illustrate an example of a detrimental out-of-order WRITE request applied to a mass-storage device. The example of FIGS. 10A-E involves a simple linked list. FIG. 10A is an abstract illustration of a general, linked-list data structure. The data structure comprises three nodes, or data blocks 1001-1003. A linked list may contain zero or more data blocks, up to some maximum number of data blocks that can be stored in the memory of a particular computer. Generally, a separate pointer 1004 contains the address of the first node of the linked list. In FIGS. 10A-E, a pointer, or address, is represented by an arrow, such as arrow 1005, pointing to the node to which the address refers, and emanating from a memory location, such as memory location 1006, in which the pointer is stored. Each node of the linked list includes a pointer and other data stored within the node. For example, node 1001 includes pointer 1007 that references node 1002 as well as additional space 1008 that may contain various amounts of data represented in various different formats. Linked lists are commonly employed to maintain, in memory, ordered sets of data records that may grow and contract dynamically during execution of a program. Linked lists are also employed to represent ordered records within the data stored on a mass-storage device. Note that the final node 1003 in the linked list of FIG. 10A includes a null pointer 1009, indicating that this node is the final node in the linked list.

FIGS. 10B-E abstractly represent data blocks, stored on a mass-storage device, that contain a linked list of data blocks. Each data-block node, such as data-block node 1010, includes a pointer, such as pointer 1012, and some amount of stored data, such as stored data 1014. The list of data blocks in FIG. 10B starts with node 1010, next includes node 1016, then node 1018, and, finally, node 1020. Each data block can be written or overwritten, in a single mass-storage-device access. Data blocks 1022 and 1024 in FIG. 10B are unused.

Consider the addition of a new node, or data block, to the end of the linked list. The two WRITE operations required to add a data block to the end of the list are illustrated in FIGS. 10C-D. First, the new node is written to data block 1024, as shown in FIG. 10C. Then, node 1020 is overwritten in order to change the pointer within node 1020 to reference the newly added node 1024. When these operations are performed in the sequence shown in FIGS. 10C-D, the linked list is consistent at each point in the two-WRITE-request operation. For example, in FIG. 10C, the new node has been added, but is not yet a member of the linked list. If the second operation, illustrated in FIG. 10D, fails, the linked list remains intact, with the only deleterious effect being an overwritten, and possibly wasted, data block 1024. In the second operation, illustrated in FIG. 10D, the pointer within data node 1020 is updated to point to already resident node 1024, leaving the linked list intact and consistent, and having a new node.

Consider, by contrast, the state of the linked list should the second WRITE operation, illustrated in FIG. 10D, occur prior to the first WRITE operation, illustrated in FIG. 10C. In this case, illustrated in FIG. 10E, the pointer within node 1020 references data block 1024. However, data block 1024 has not been written, and is therefore not formatted to contain a pointer having a null value. If, at this point, the second WRITE operation fails, the linked list is corrupted. A software routine traversing the nodes of the linked list cannot determine where the list ends. Moreover, the software routine will generally interpret any data found in data block 1024 as the contents of the fifth node of the linked list, possibly leading to further data corruption. Thus, the order of WRITE operations for adding a node to a linked list stored on a mass-storage device is critical in the case that all WRITE operations are not successfully carried out. When WRITE requests are extracted from the time-ordered WRITE-request buffer shown in FIG. 9A and issued to a remote-mirror, the remote-mirror will remain in a data-consistent state throughout the period time during which the buffered WRITE requests are carried out, providing that the order in which the WRITE request received by the dominant LUN is consistent. However, when tracks or cylinders flagged in the WRITE-request bit-map buffer of FIG. 9B are retrieved and sent in an arbitrary order to the remote-mirror LUN, the data state of the remote-mirror LUN may be quite inconsistent, and potentially corrupted, until all tracks or cylinders flagged within the WRITE-request bit-map buffer are successfully transferred to the remote LUN and stored within mass-storage devices of the remote LUN. The corruption illustrated in FIGS. 10A-E is rather straightforward and simple. The potential corruption within hundreds of gigabytes of data stored within a mass-storage-device LUN and incompletely transferred, out-of-order, to a remote LUN is staggering. Literally hundreds of thousands of complex data interrelationships may be irreparably broken.

Unfortunately, currently available mass-storage devices, such as disk arrays, have only a limited capacity to buffer WRITE requests within a time-ordered WRITE-request buffer during communication failure between a dominant LUN and a remote-mirror LUN. In general, even large electronic memory components can buffer only a few tens of gigabytes of data. When a communication failure persists for more than a short period of time, the dominant LUN needs to switch to a WRITE-request bit-map buffer in order to be able to keep track of those tracks of cylinders overwritten during the communications failure. This, in turn, opens a relatively wide window for unrecoverable failures in the dominant LUN/remote-mirror LUN system. If the communications link again fails during the remote-mirror LUN resynchronization operation, when overwritten tracks and cylinders are retrieved and transmitted to the remote-mirror LUN from the dominant LUN, the remote-mirror LUN is almost certainly left in a seriously inconsistent and unrecoverable state. When communications is again restored, the entire WRITE-request bit-map buffer flush operation must be restarted from the beginning. More seriously, if the second communication failure is accompanied by a failure of the dominant LUN, there remains no uncorrupted data within the dominant LUN/remote-mirror LUN pair accessible to remote users. If, in the worst case, the data stored within the dominant LUN is corrupted or lost due to the dominant-LUN failure, then it is impossible to reconstruct an uncorrupted, consistent data set. Thus, a very real possibility for complete loss of data from both the dominant LUN and the remote-mirror LUN currently exists in commonly available mass-storage mirroring systems.

Designers, manufacturers, and users of highly available, dominant LUN/remote-mirror LUN mass-storage-device pairs have therefore recognized the need for a more reliable method for deferring execution of WRITE requests on the remote-mirror LUN during communications failure between the dominant LUN and the mirror LUN and a more reliable method for resynchronizing the data state of the mirror LUN with that the dominant LUN following restoration of communications between the dominant LUN and mirror LUN.

SUMMARY OF THE INVENTION

In one embodiment of the present invention, the large window of potential data corruption and data loss attendant with current dominant LUN/remote-mirror LUN resynchronization operations is significantly narrowed, or closed altogether, by enhancing resynchronization functionality on both the dominant LUN and the remote-mirror LUN of a dominant LUN/remote-mirror-LUN mass-storage-device pair. On the dominant LUN, hot spare disks are employed to create a much larger, disk-based, time-ordered WRITE-request buffer that spans both electronic memory and hot spare disks. The much larger, time-ordered, WRITE-request buffer in the modified dominant LUN allows for storing WRITE requests in time order for a much longer period of time during communications failure between the dominant LUN and remote-mirror LUN than in the current mass-storage devices that employ only an electronic-memory-based, time-ordered WRITE-request buffer. On the remote-mirror LUN, mass-storage space is provided for an alternate LUN that can be resynchronized with the dominant LUN following restoration of communications between the dominant LUN and remote-mirror LUN. When resynchronization is complete, a simple LUN-pointer switch operation can be employed to designate the alternate LUN as the new remote-mirror LUN, and the previous remote-mirror LUN as the alternate LUN.

In alternate embodiments, the dominant-LUN time-ordered WRITE-request buffer may be implemented only in data-storage space composed of hot spare disks. In yet further alternate embodiments, the alternate remote-mirror LUN may be composed either of hot spare disks or by addition of an internal duplicate mirror. An internal duplicate mirror can be embedded directly within a disk array, or may be attached or interconnected with the disk array in the form of an auxiliary mass-storage device.

DETAILED DESCRIPTION OF THE INVENTION

One embodiment of the present invention involves greatly increasing the size of the time-ordered WRITE-request buffer for storing WRITE requests during communications failures between the dominant LUN and a remote-mirror LUN. In addition, an alternate LUN is provided within the remote-mirror LUN so that resynchronization of the remote-mirror LUN can be carried out by an essentially atomic operation of switching a LUN pointer to point to the resynchronized alternate LUN.

Figure 1A:
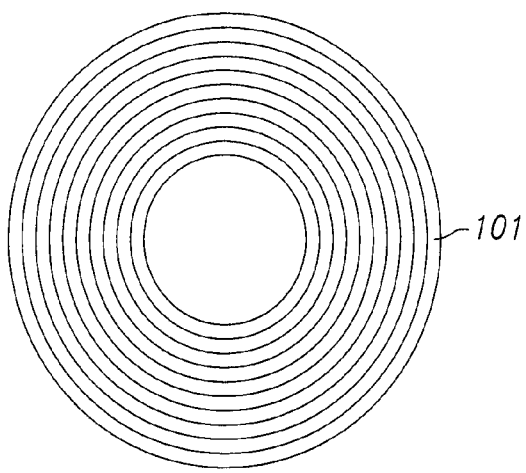
FIG. 1A illustrated tracks on the surface of a disk platter.
Figure 1B:
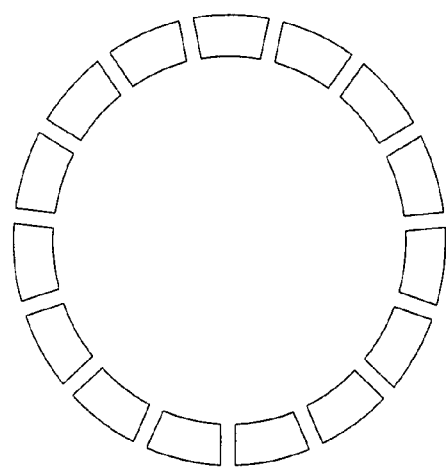
FIG. 1B illustrates sectors within a single track on the surface of the disk platter.
Figure 2:
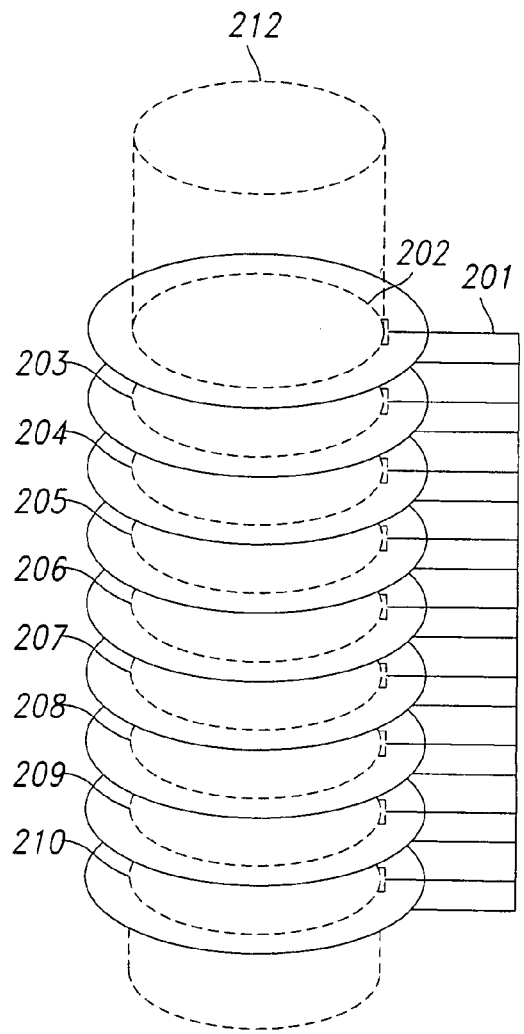
FIG. 2 illustrates a number of disk platters aligned within a modern magnetic disk drive.
Figure 3:
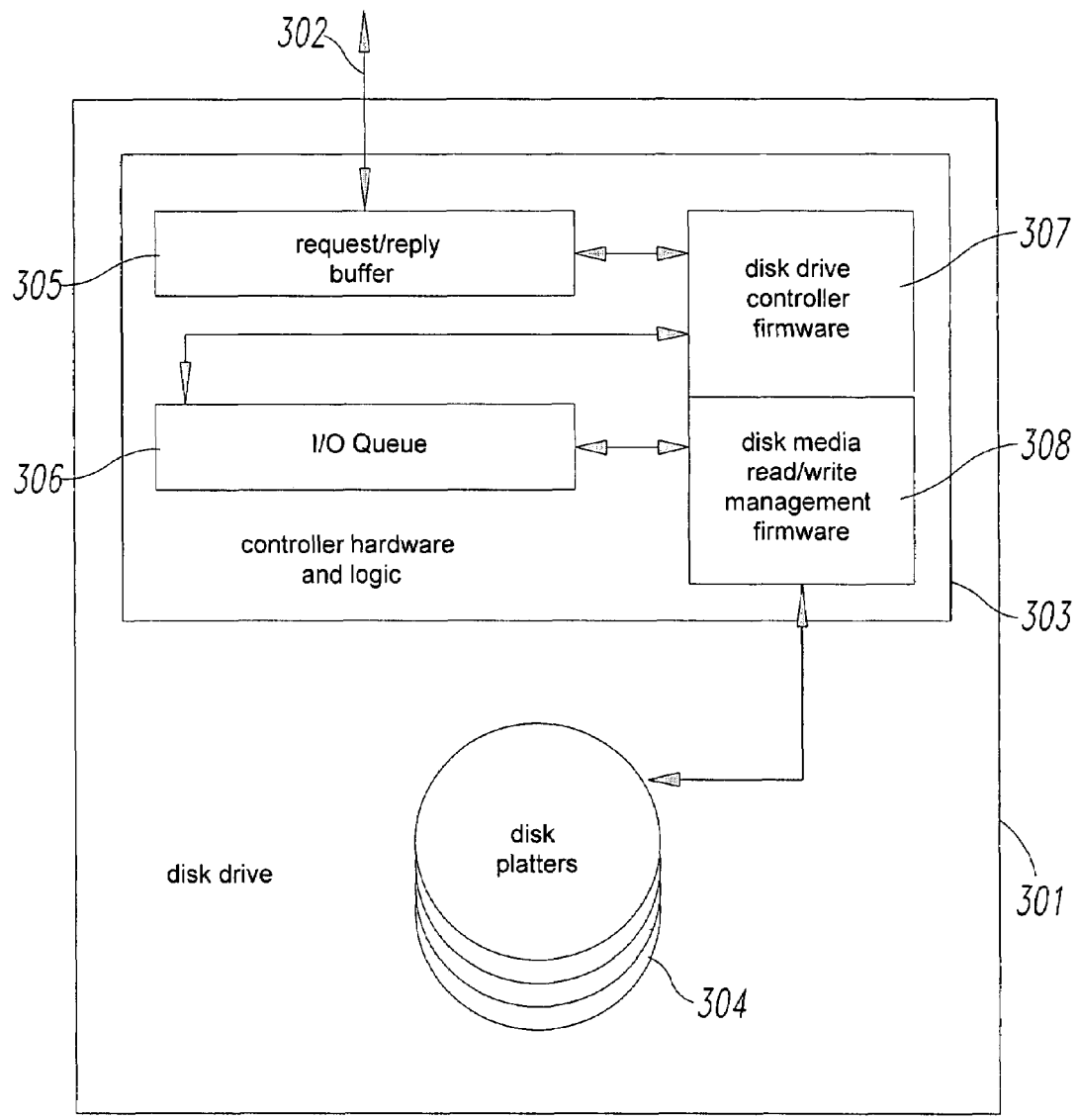
FIG. 3 is a block diagram of a standard disk drive.
Figure 4:
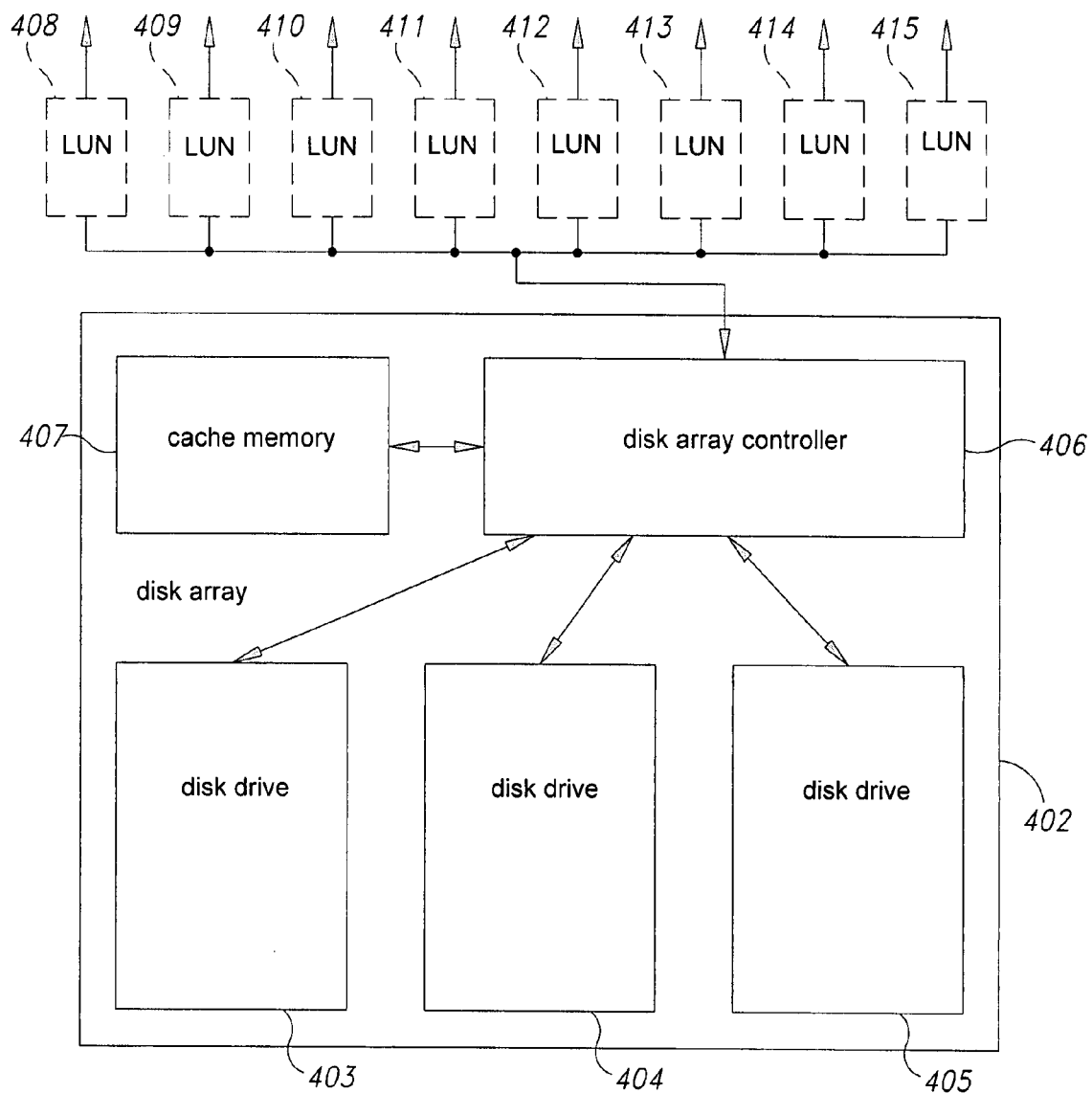
FIG. 4 is a simple block diagram of a disk array.
Figure 5:
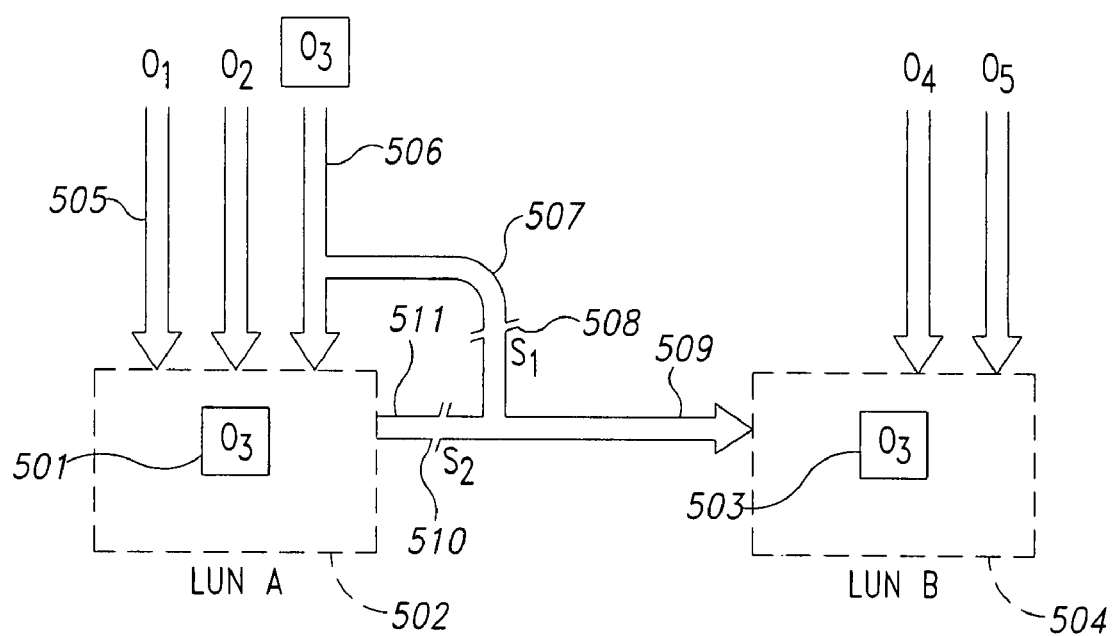
FIG. 5 illustrates object-level mirroring.
Figure 6:
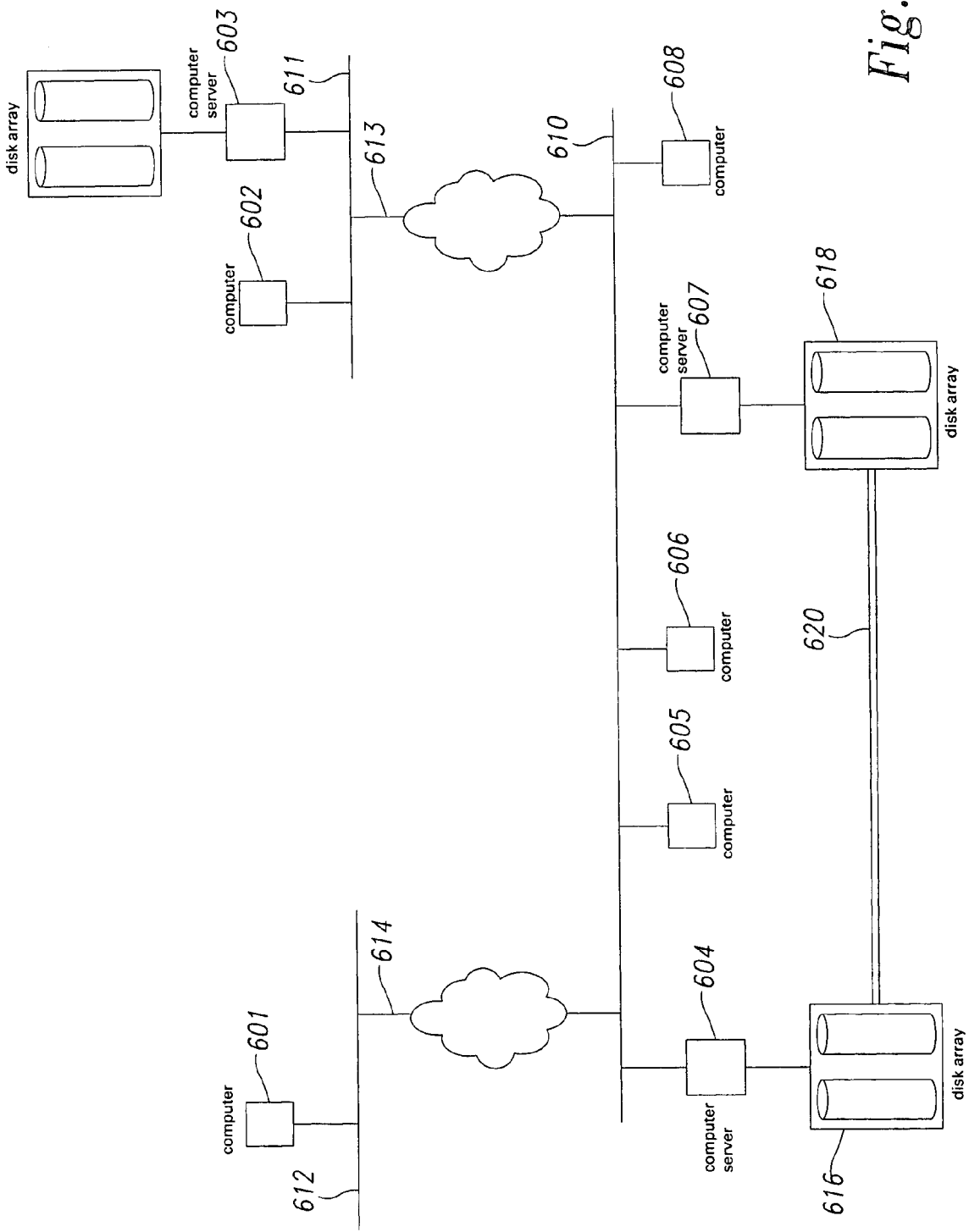
FIG. 6 illustrates a dominant LUN coupled to a remote-mirror LUN.
Figure 7:
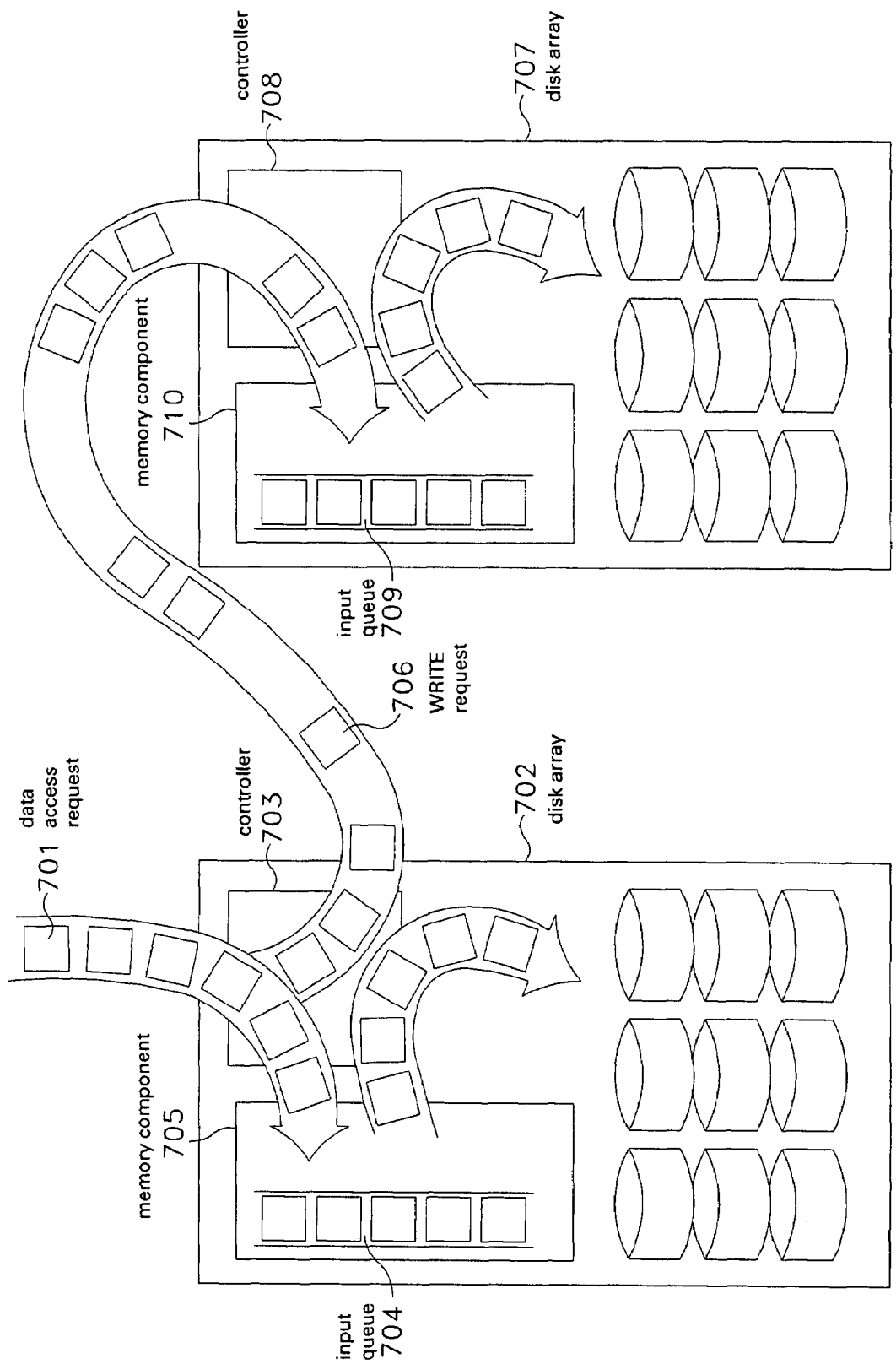
FIG. 7 schematically illustrates normal operation of a dominant LUN/remote-mirror-LUN pair.
Figure 8:
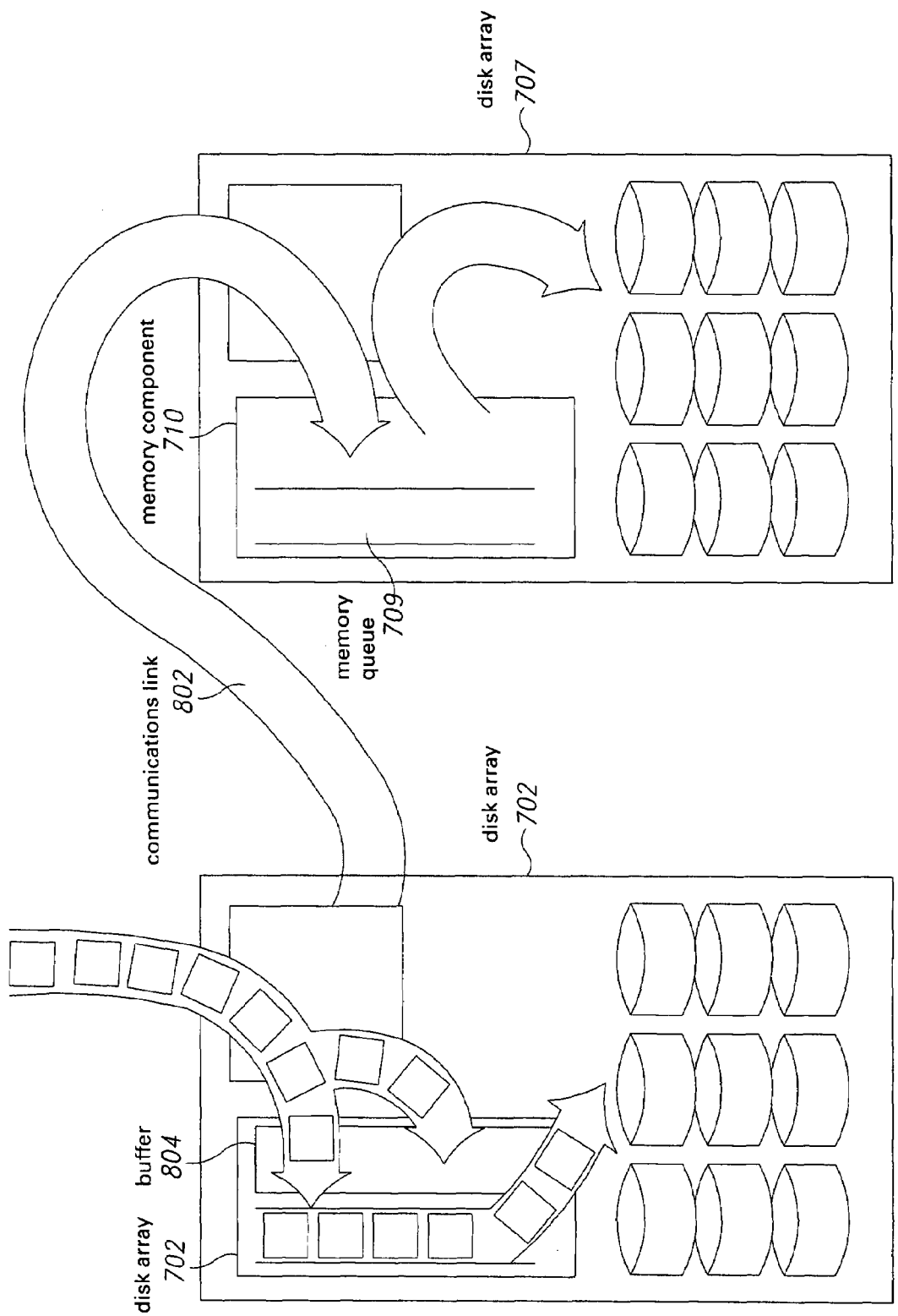
FIG. 8 illustrates a communications failure between a dominant LUN/remote-mirror-LUN pair.
Figure 9B:
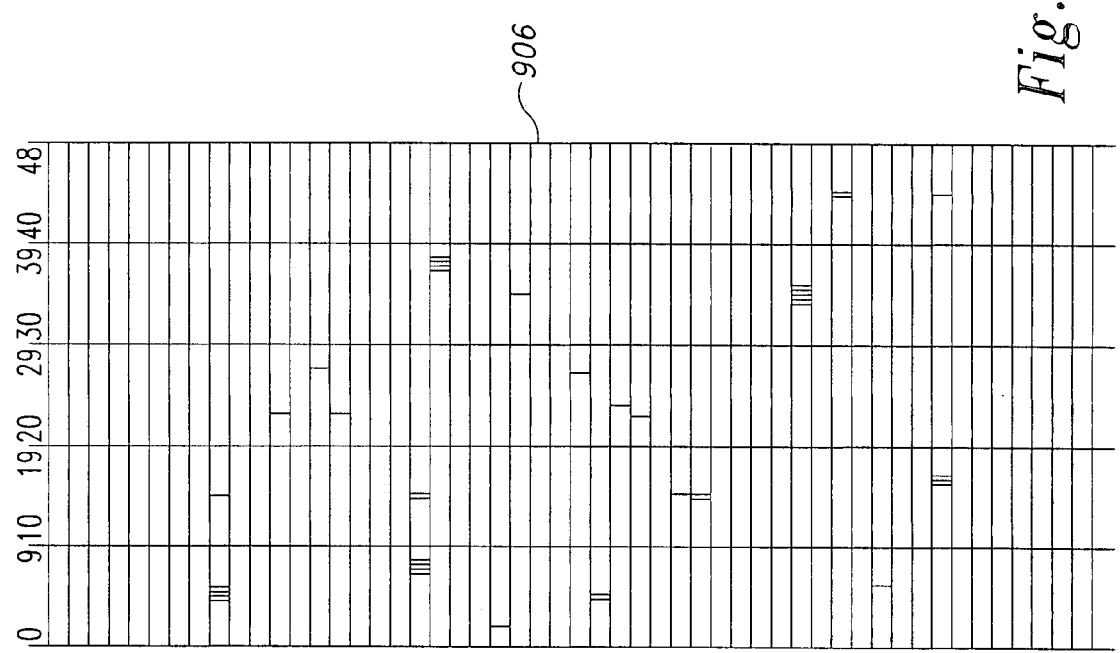
FIGS. 9A and 9B illustrate two different types of WRITE-request buffers.
Figure 9A:
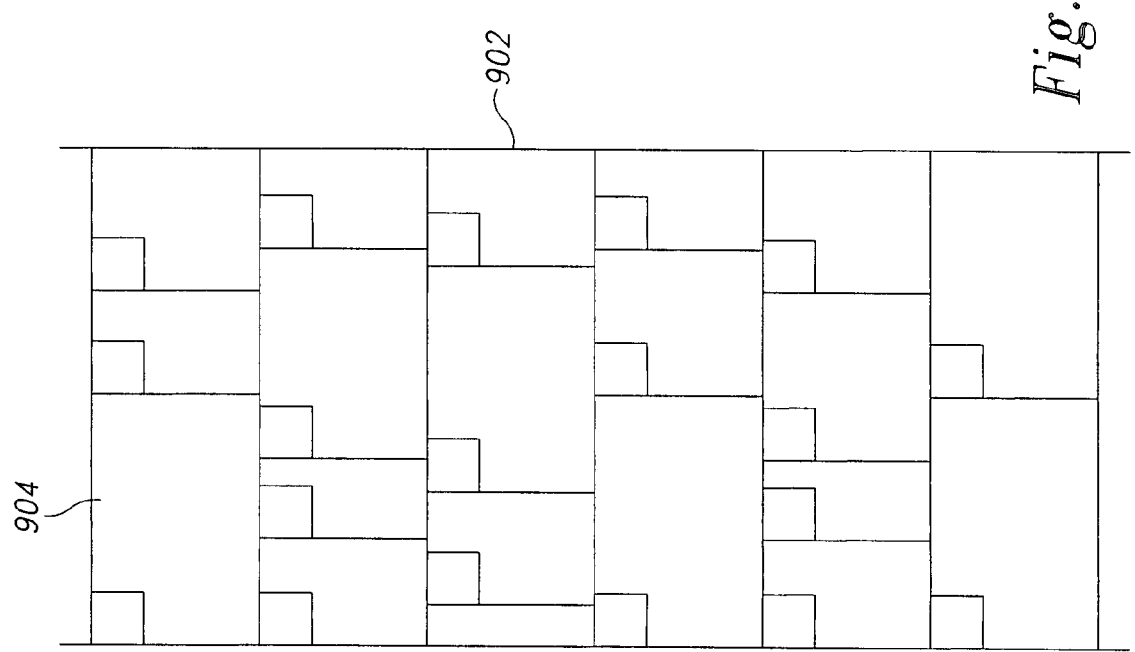
Figure 10A:
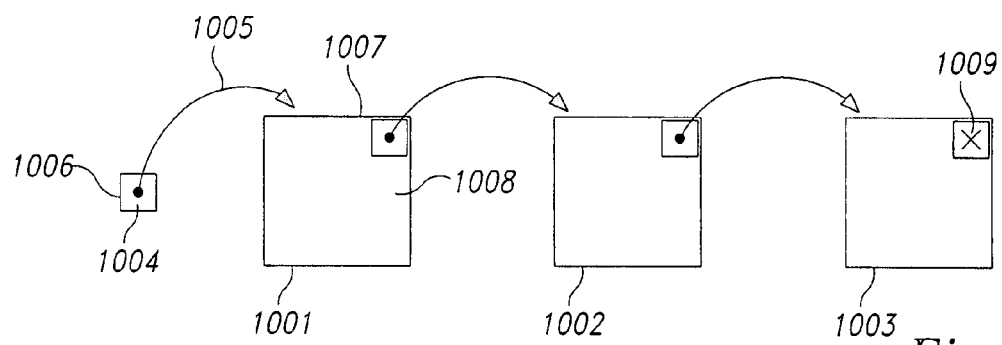
FIGS. 10A-E illustrate an example of a detrimental, out-of-order WRITE request applied to a mass-storage device.
Figure 10B:
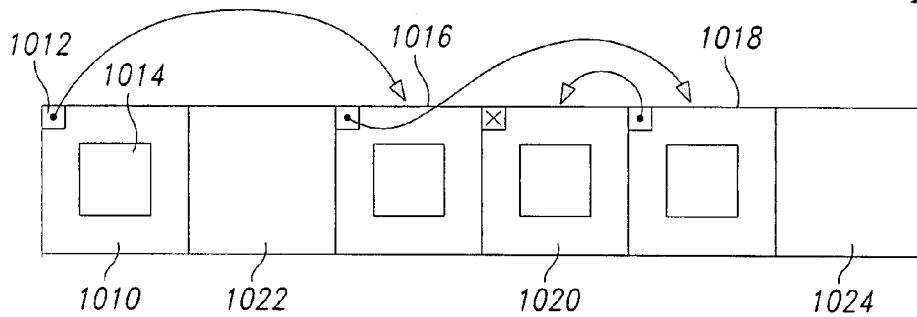
Figure 10C:
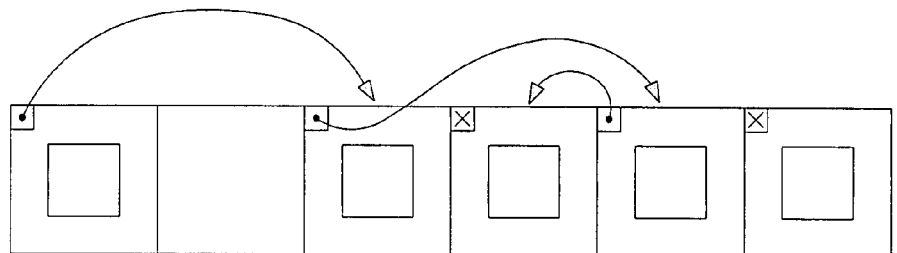
Figure 10D:
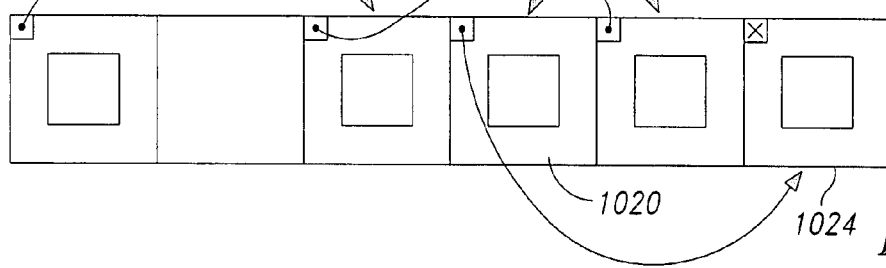
Figure 10E:
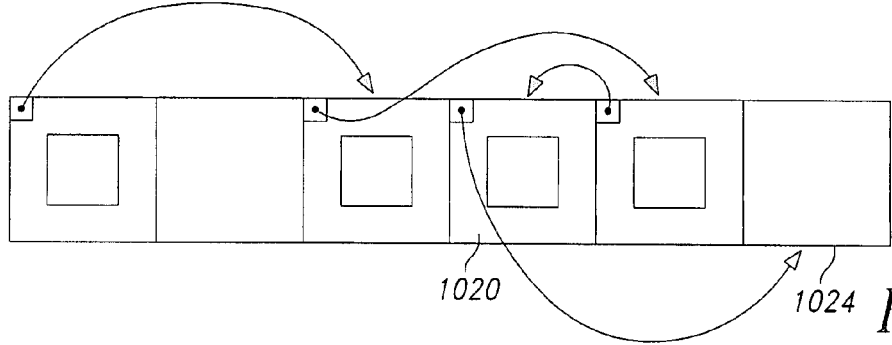
Figure 11:
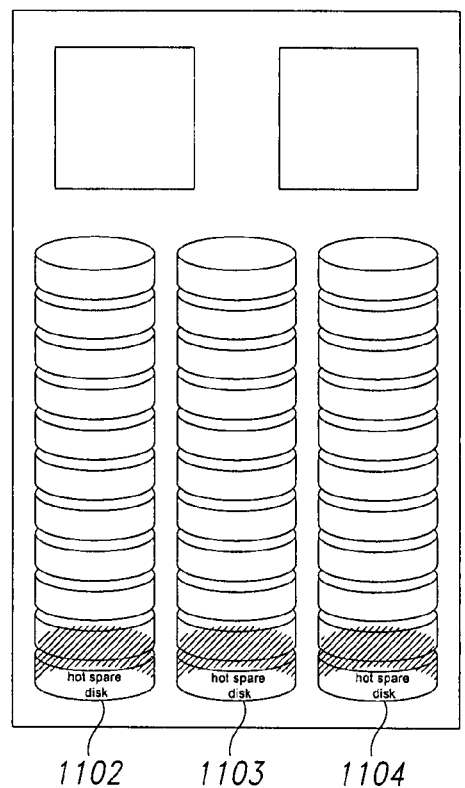
FIG. 11 schematically illustrates a disk array that includes hot spare disks.
Figure 12:
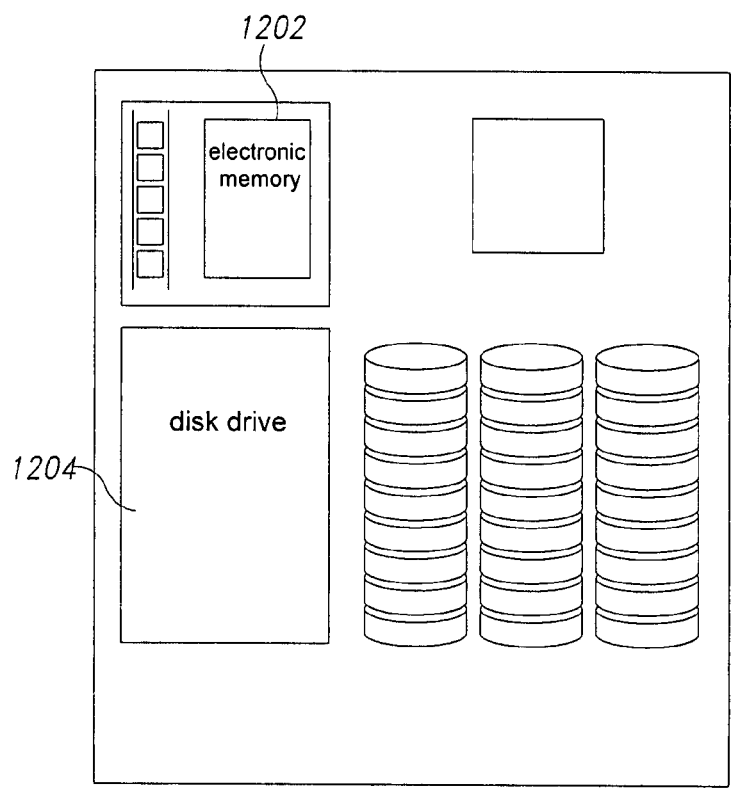
FIG. 12 illustrates one embodiment, in which an expanded, time-ordered WRITE-request buffer is provided.

In commonly available disk arrays, a certain percentage of the physical disk drives within the array are maintained in a stand-by mode for dynamic hot swapping in the event of failure of an on-line disk drive unit. These stand-by disks are referred to as "hot spares." FIG. 11 schematically illustrates a disk array that includes hot spare disks. In FIG. 11, the disks 1102-1104 are distinctly shaded to indicate that they are hot spare disks, currently in a stand-by mode, that can be used as instantaneous substitutes for other on-line disks within the disk array that may fail at some future time. Currently, the data-storage space within the hot spare disks is generally not used for data storage. One aspect of one embodiment of the present invention involves using the data-storage space within hot spare disks as a portion of, or the entire, time-ordered WRITE-request buffer for storing WRITE requests during a period of communication failure for subsequent transmission to the remote-mirror LUN once communications are restored. FIG. 12 illustrates one embodiment, in which an expanded, time-ordered, WRITE-request buffer is provided. In FIG. 12, the time-ordered, WRITE-request buffer is distributed between a portion of electronic memory 1202 and data-storage space within hot spare disk drives 1204. Whereas the electronic-memory portion of the time-ordered WRITE-request buffer generally has a data-storage capacity of on the order of several tens of gigabytes, up to perhaps forty gigabytes, the hot spare data-storage capacity of ten hot spare disk drives in a 512-disk-drive disk array may provide an additional hundreds of gigabytes of storage. Thus, the time-ordered WRITE-request buffer can be expanded, according to the present invention, by ten-fold to twenty-fold in current mass-storage devices, and may be even more greatly expanded in future mass-storage devices. This increases, by a factor of 10 to 20, the time during which WRITE requests can be buffered by the dominant LUN during a communications failure. In many cases, this additional buffering time is adequate to prevent switching from time-ordered, WRITE-request buffering to WRITE-request bit-map buffering. In an alternative embodiment, not shown in FIG. 12, the expanded, time-ordered, WRITE-request buffer is implemented entirely in hot spare disk storage space.

Figure 13:
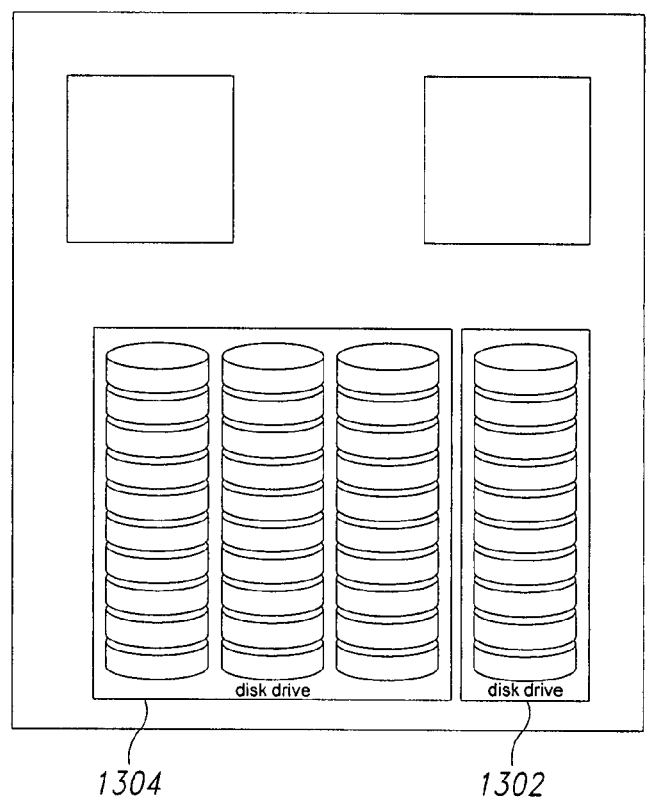
FIG. 13 illustrates an alternate LUN provided by including a large number of additional disk drives within a disk array.
Figure 14:
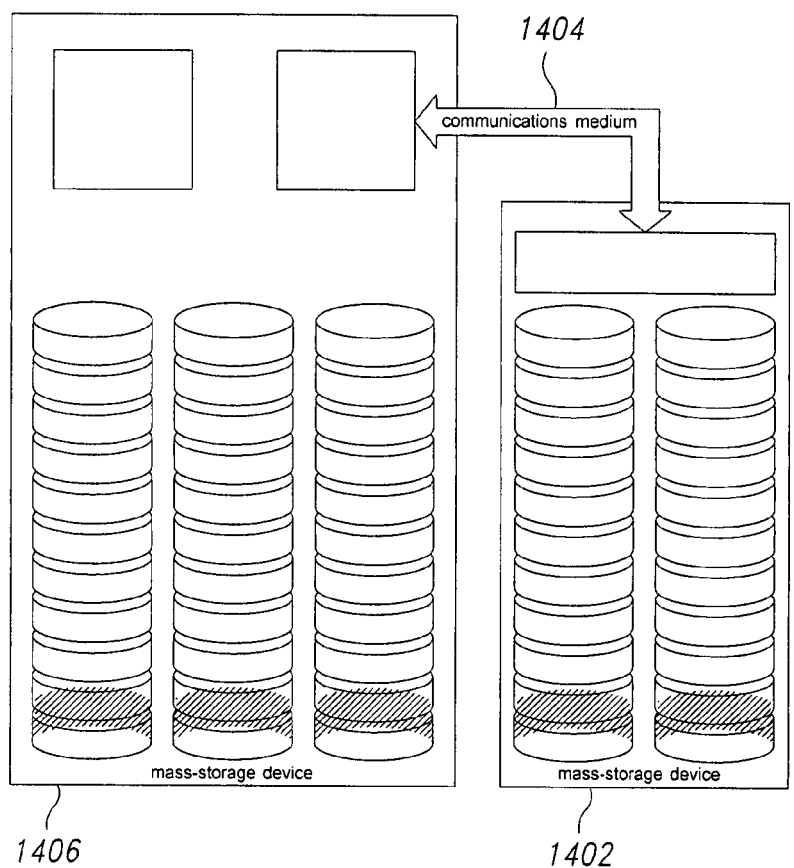
FIG. 14 schematically illustrates a second alternative for providing an alternate LUN on the disk array or other type of mass-storage device that includes a remote-mirror LUN.

On the remote-mirror LUN, any of several possible methods can be employed to create an alternate LUN. FIG. 13 illustrates an alternate LUN provided by including a large number of additional disk drives within a disk array. In FIG. 13, the additional disk drives 1302 are logically grouped together in a second LUN distinct from a first LUN comprising a different, large set of disk drive units 1304. FIG. 14 schematically illustrates a second alternative for providing an alternate LUN on the disk array or other type of mass-storage device that includes a remote-mirror LUN. In FIG. 14, an auxiliary mass-storage device 1402 has been interconnected, via communications medium 1404, to the mass-storage device 1406 that provides the remote-mirror LUN for a dominant LUN/remote-mirror-LUN pair. A third alternative is to employ hot spare disks within the mass-storage device providing the remote-mirror LUN for data-storage space from which to create an alternate LUN. In the first two alternatives, illustrated in FIGS. 13 and 14, the current remote-mirror LUN and the alternate LUN can be switched, or interchanged, via a simple LUN pointer switch. In other words, a LUN is a logical collection of disks represented in memory by the controller of the mass-storage device using any of a number of different in-memory data structures. Those data structures can be easily updated to interchange LUNs. In the third alternative, employing hot spare disks, resynchronization involves mirroring the remote-mirror LUN from the alternate LUN created from hot spare disks, carrying out WRITE requests transmitted from the dominant LUN to the remote-mirror LUN during resynchronization on the alternate LUN, and then locally copying the alternate LUN back to the remote-mirror LUN. A local copy is far less prone to error than transmitting deferred WRITE requests from the dominant LUN to the remote-mirror LUN and carrying out the transmitted WRITE requests as they are received from the dominant LUN.

The method of one embodiment of the present invention is next discussed with reference to seven flow-control diagrams provided in FIGS. 15-21. These flow-control diagrams represent a dominant-LUN-centric view of the resynchronization process. In the flow-control-diagram-based illustration represented by FIGS. 15-21, the various component operations of the resynchronization are initiated by the dominant LUN. However, in alternate embodiments, some or almost all of the component operations may instead be initiated by the remote mass-storage device. Just as there are many different approaches to describing a single embodiment, there are also many possible alternative embodiments of the present invention. FIGS. 15-21 illustrate one representative embodiment in one fashion, and are not included to in any way limit the described invention to one or a few embodiments or implementations.

Figure 15:
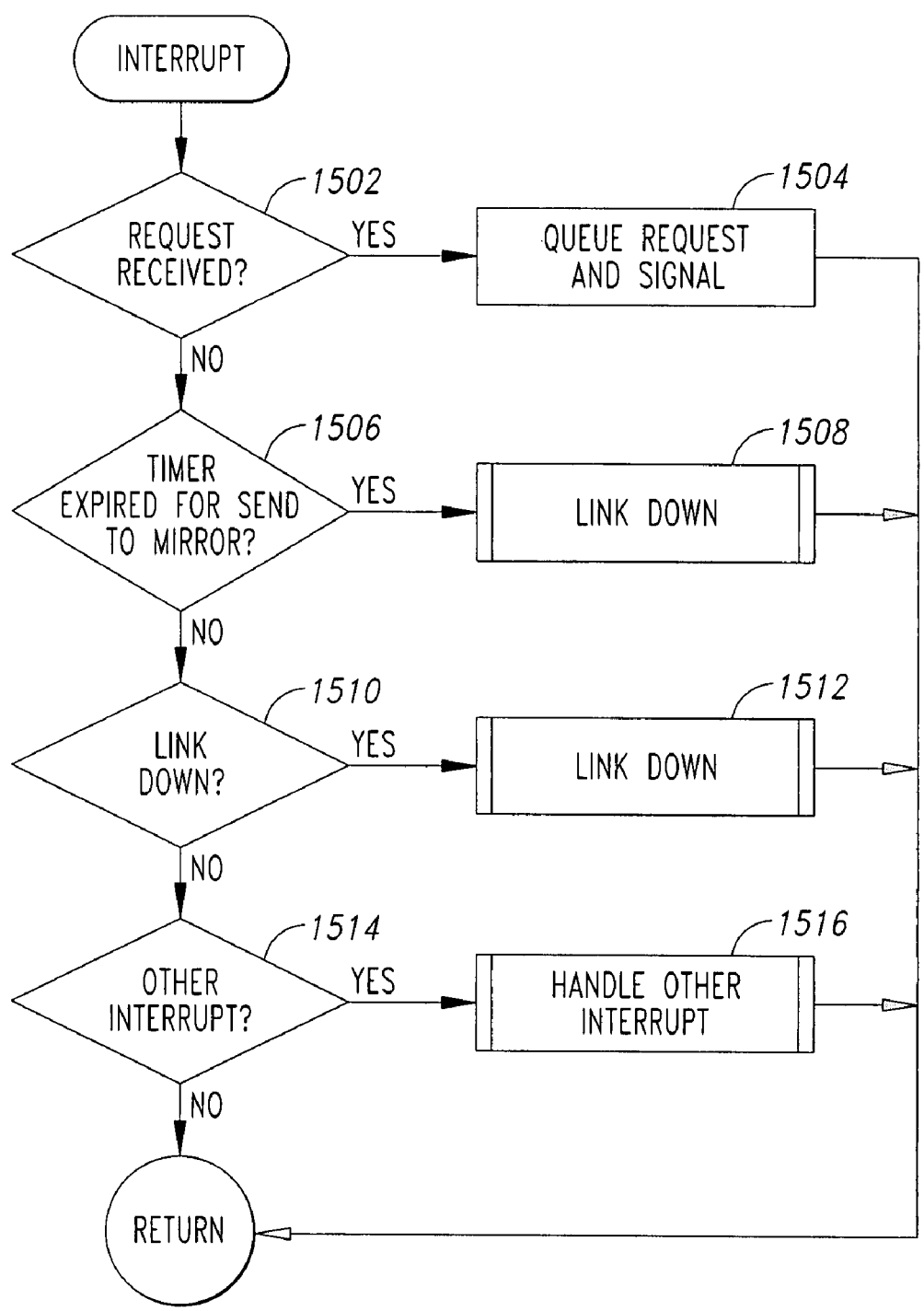
FIG. 15 is a flow-control diagram for a simple interrupt handler within the controller of the mass-storage device provided in the dominant LUN.

FIG. 15 is a flow-control diagram for an interrupt handler within the controller of the mass-storage device provided in the dominant LUN. Where an interrupt occurs, the interrupt handler is invoked by low-level control programs. Many different types of interrupts may be generated. If the interrupt indicates reception of a request by the mass-storage device from a communications medium, as determined in step 1502, then the interrupt handler receives the request, queues it to an incoming request queue, and generates a signal to restart a main-loop routine, to be described below, in step 1504. If the interrupt indicates expiration of a timer set upon transmission of a request to a remote mass-storage device providing a remote-mirror LUN, as determined in step 1506, then a link-down routine is invoked in step 1508 to initialize storing of received write requests by the dominant LUN until communications can be restored between the dominant LUN and the remote-mirror LUN. Similarly, if the interrupt indicates detection of a communications failure, as detected in step 1510, then the link-down routine is called in step 1512. Many other interrupts are similarly handled, as indicated by steps 1514 and 1516.

The link-down routine invoked in steps 1508 and 1512 of the interrupt handling routine is not further described in a flow-control diagram. This link-down routine may be quite simple, involving initializing one or more variables within control software memory according to certain configuration parameters. For example, setting the Boolean variable "m_cache," to be described below, to the value TRUE is sufficient to begin buffering of WRITE requests in the embodiment described in FIGS. 15-21. In other embodiments, the link-down may be more complex, and involve extensive state modification and buffer initialization.

Figure 16:
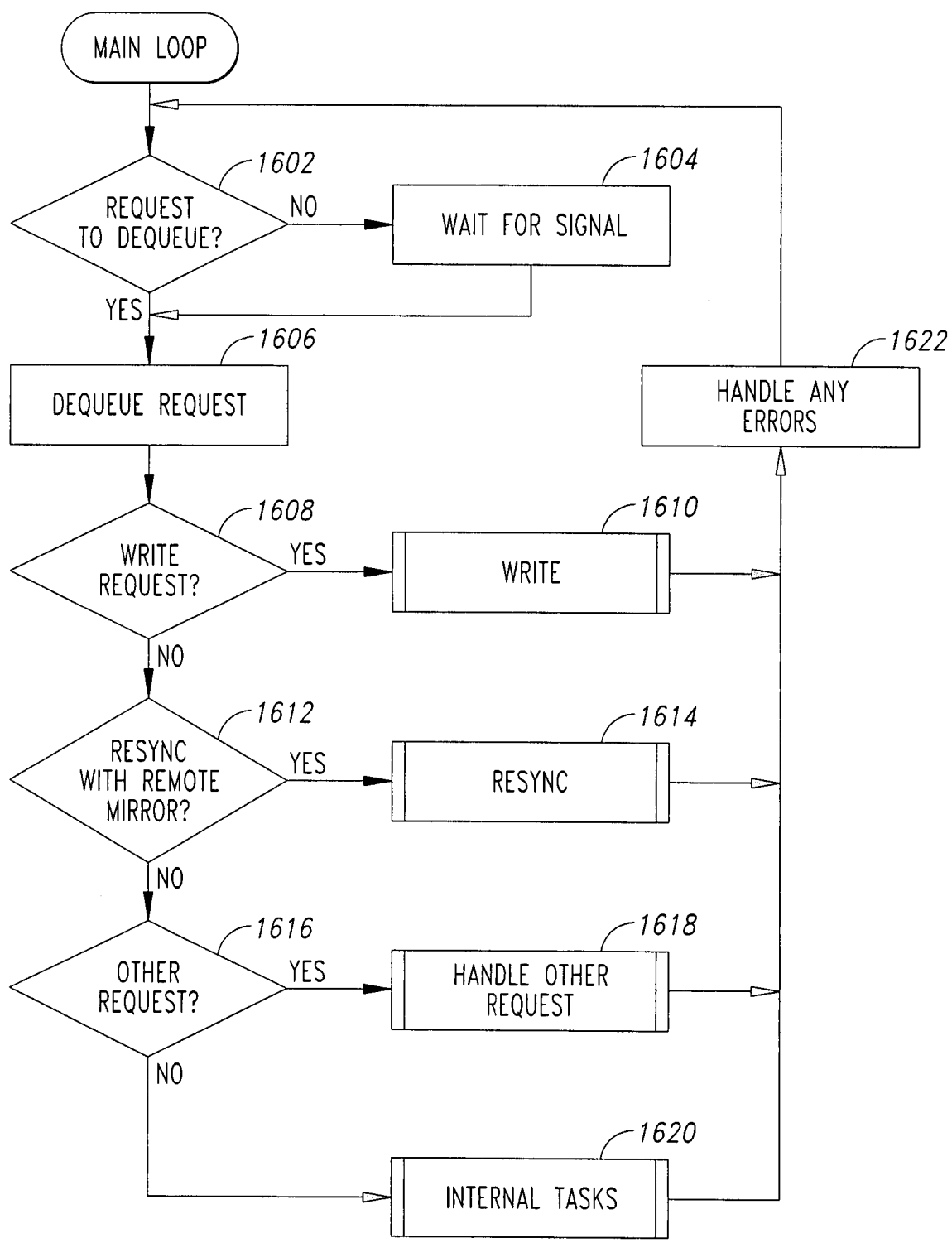
FIG. 16 is a flow-control diagram for a main-loop routine run by the controller of the mass-storage device provided in the dominant LUN.

FIG. 16 is a flow-control diagram for a main-loop routine run by the controller of the mass-storage device provided in the dominant LUN. The main loop continues to execute while there are any tasks available for handling by the controller routines, and otherwise waits to receive a signal from the interrupt handling routine. In step 1602, the main loop determines whether there is a newly arrived request to dequeue from the request input queue for processing. If not, then the main loop waits, in step 1604, for a signal from the interrupt handler to resume operation. If there is a request to dequeue, then, in step 1606, the controller of the mass-storage device dequeues the request from the input queue. In step 1608, the main loop determines whether or not the dequeued request is a WRITE request. If so, then the routine "write" is invoked in step 1610. In step 1612, the main loop determines whether the dequeued request is a RESYNC request and, if so, the routine "resync" is invoked in step 1614. Other types of requests are similarly handled, as represented in steps 1616 and 1618. If no requests are dequeued for handling, the main loop may execute an internal "tasks" routine, in step 1620, to handle other tasks managed by the controller of the mass-storage device provided in the dominant LUN. Following the return of any of the invoked routines in step 1610, 1614, 1618, and 1620, the controller handles any errors returned by those routines in step 1622.

Figure 17:
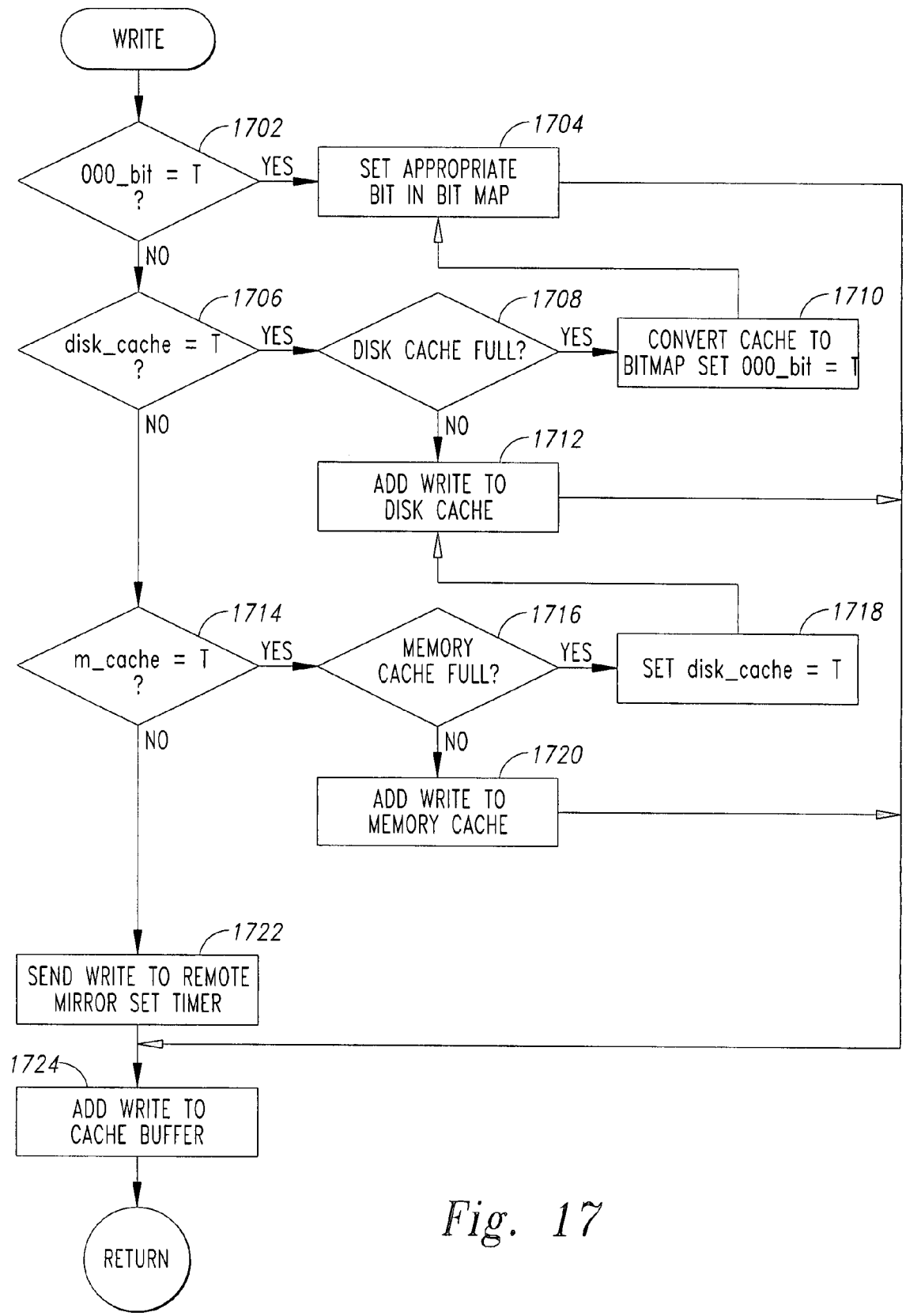
FIG. 17 is a flow-control diagram for the routine "write," invoked in step 1610 of FIG. 16.

FIG. 17 is a flow-control diagram for the routine "write," invoked in step 1610 of FIG. 16. Four different variables are used to control buffering of incoming WRITE requests during a communications failure. The variable "ooo_bit" is a Boolean variable that indicates, when TRUE, that a WRITE-request bit-map buffer is being used to keep track of all tracks or cylinders modified during the communications failure. The Boolean variable "disk_cache," when TRUE, indicates that the disk-based portion of a time-ordered WRITE-request buffer is being used to store time-ordered WRITE requests during a communications failure. The Boolean variable "m_cache," when TRUE, indicates that the electronic-memory-based portion of the time-ordered WRITE-request buffer is being used to store WRITE requests during a communications failure.

In step 1702, the routine "write" determines whether or not WRITE requests are being stored in a WRITE-request bit map. If so, then the appropriate bits in the bit map that represent tracks or cylinders effected by the WRITE request are set, in step 1704. Otherwise, if the Boolean variable "disk_cache" has the value TRUE, as detected in step 1706, then, in step 1708, the routine "write" determines whether or not the disk-based portion of the time-ordered WRITE-request buffer has been filled. If so, then the time-ordered WRITE-request buffer is converted to a WRITE-request bit-map buffer, in step 1710, and the Boolean variable "ooo_bit" is set to TRUE, before control flows to step 1704, described above. Otherwise, if the time-ordered WRITE-request buffer is not full, then the WRITE request is added to the time-ordered WRITE-request buffer in step 1712. Note that many different implementations of time-ordered WRITE-request buffers and WRITE-request bit-map buffers can be employed, and the details of these many different variations are not discussed in this document, as they are well-known to those ordinarily skilled in the art of designing of mass-storage-device controllers and controller software. Otherwise, the routine "write" determines, in step 1714, whether WRITE requests are currently being buffered in the electronic-memory portion of the time-ordered WRITE-request buffer. If so, then in step 1716, the routine "write" determines whether the electronic-memory portion of the time-ordered WRITE-request buffer is full. If so, then, in step 1718, the routine "write" sets the Boolean variable "disk_cache" to TRUE before directing control to step 1712, described above. If the time-ordered WRITE-request buffer is not full, then the WRITE request is added to the electronic-memory portion of the time-ordered WRITE-request buffer in step 1720. If WRITE requests are not being buffered due to a communications failure, then the WRITE request is forwarded to the mass-storage device provided in the remote-mirror LUN in step 1722, and a timer is set to expire if acknowledgement is not received within the timer period from the remote-mirror LUN. Finally, the WRITE request is queued to the cache buffer of the dominant LUN in step 1724, from which it is subsequently dequeued and transferred to a disk drive unit within the mass-storage device provided in the dominant LUN.

Figure 18:
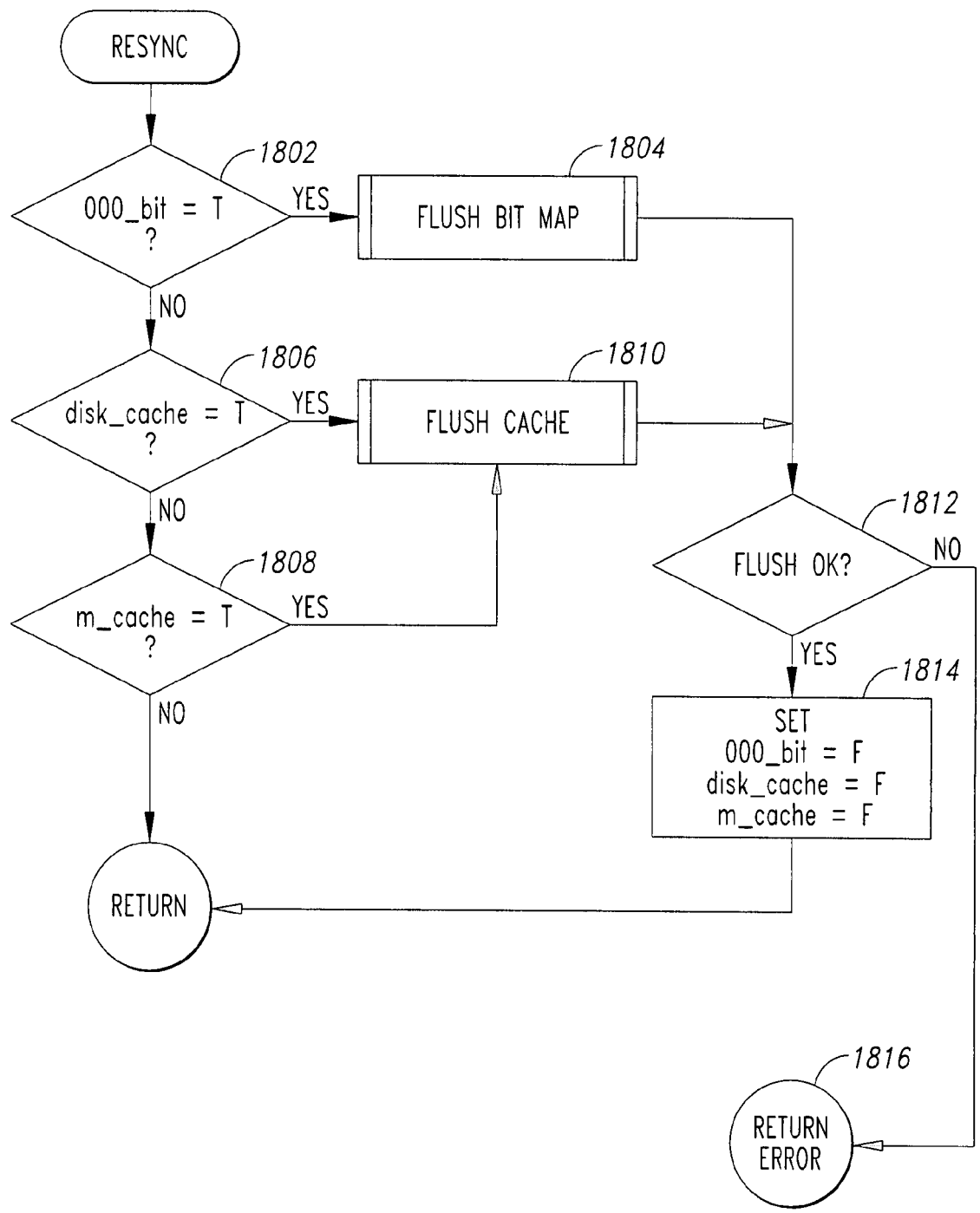
FIG. 18 is a flow-control diagram of the routine "resync," invoked in step 1614 of FIG. 16.

FIG. 18 is a flow-control diagram of the routine "resync," invoked in step 1614 of FIG. 16. Resync determines, by examining the values of the variables ooo_bit, disk_cache, and m_cache, whether or not deferred WRITES have been stored in a time-ordered WRITE-request buffer or in a WRITE-request bit-map buffer. In the case that the variable "ooo_bit" has the Boolean value TRUE, as detected in step 1802, then the routine "flush bit map" is invoked in step 1804 by resync. If the Boolean variables "disk_cache" or "m_cache" have the value TRUE, as detected in steps 1806 and 1808 by resync, then the routine "flush cache" is invoked in step 1810. Following flushing of the time-ordered WRITE-request buffer or WRITE-request bit-map buffer, resync determines whether the flush was carried out successfully in step 1812. If so, then the Boolean variables are reinitialized to contain the Boolean value FALSE, in step 1814, before resync returns. If the flush did not successfully conclude, then an error is returned by resync in step 1816.

Figure 19:
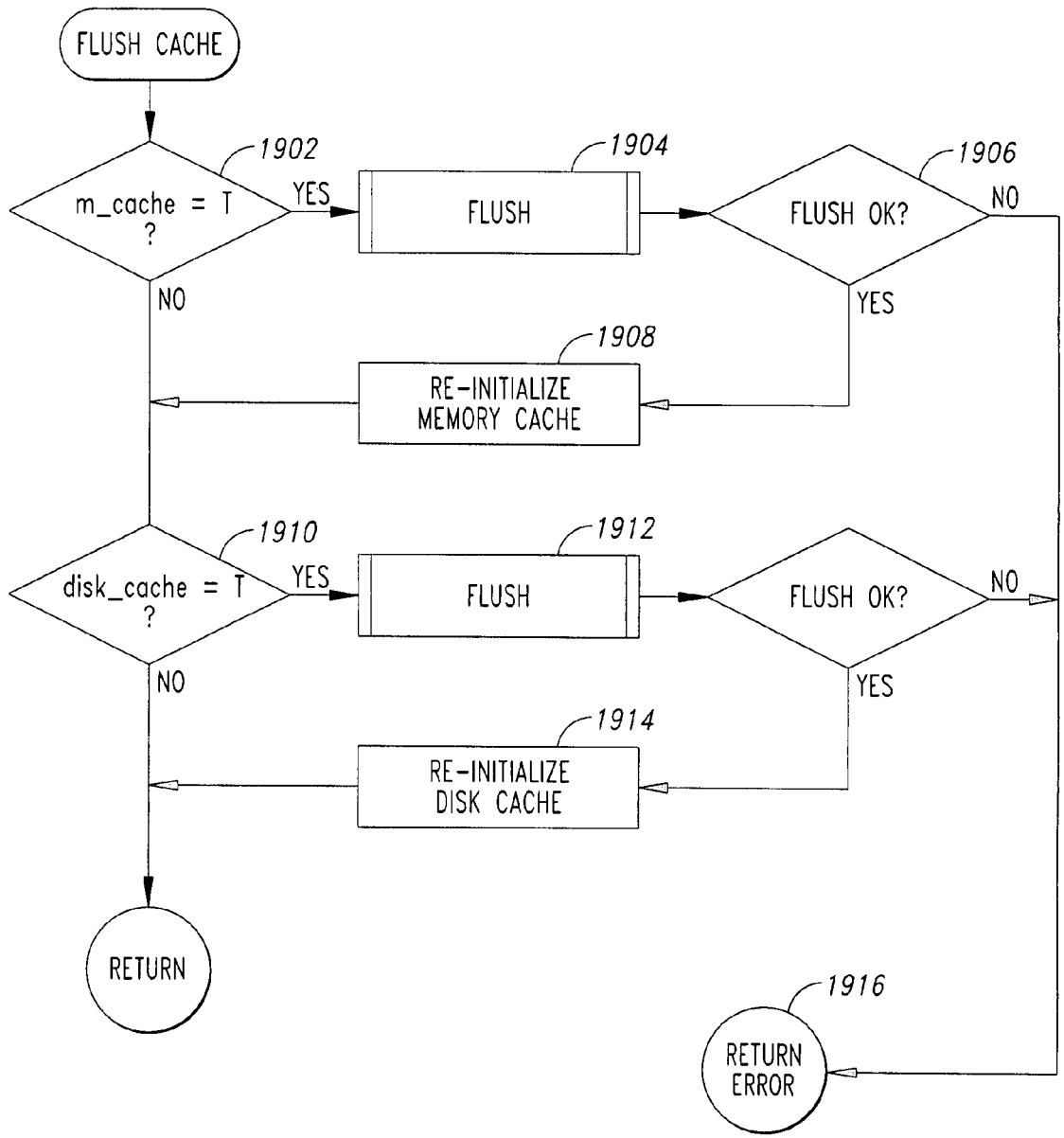
FIG. 19 is a flow-control diagram for the routine "flush cache," invoked in step 1810 of FIG. 18.

FIG. 19 is a flow-control diagram for the routine "flush cache" invoked in step 1810 of FIG. 18. The routine flush cache first determines, in step 1902, whether the electronic-memory portion of the time-ordered WRITE-request buffer has failed, and, if so, invokes the routine "flush, in step 1904, to flush the electronic-memory portion of the time-ordered WRITE-request buffer. If the flush successfully completes, as detected in step 1906, then the routine "flush cache" reinitializes the electronic-memory portion of the time-ordered WRITE-request buffer in step 1908. Similarly, the routine "flush cache" determines whether the disk-based portion of the time-ordered WRITE-request buffer has been filled, in step 1910, and, if so, invokes the routine "flush" in step 1912 to flush the disk-based portion of the time-ordered WRITE-request buffer. Following the flush, the routine "flush cache" reinitializes the disk-based portion of the time-ordered WRITE-request buffer in step 1914. If a flush does not successfully complete, then an error is returned in step 1916. Note that error handling is not further discussed, because error handling is quite dependent on low-level implementation details and controller-design details that are outside the scope of the present invention.

Figure 20:
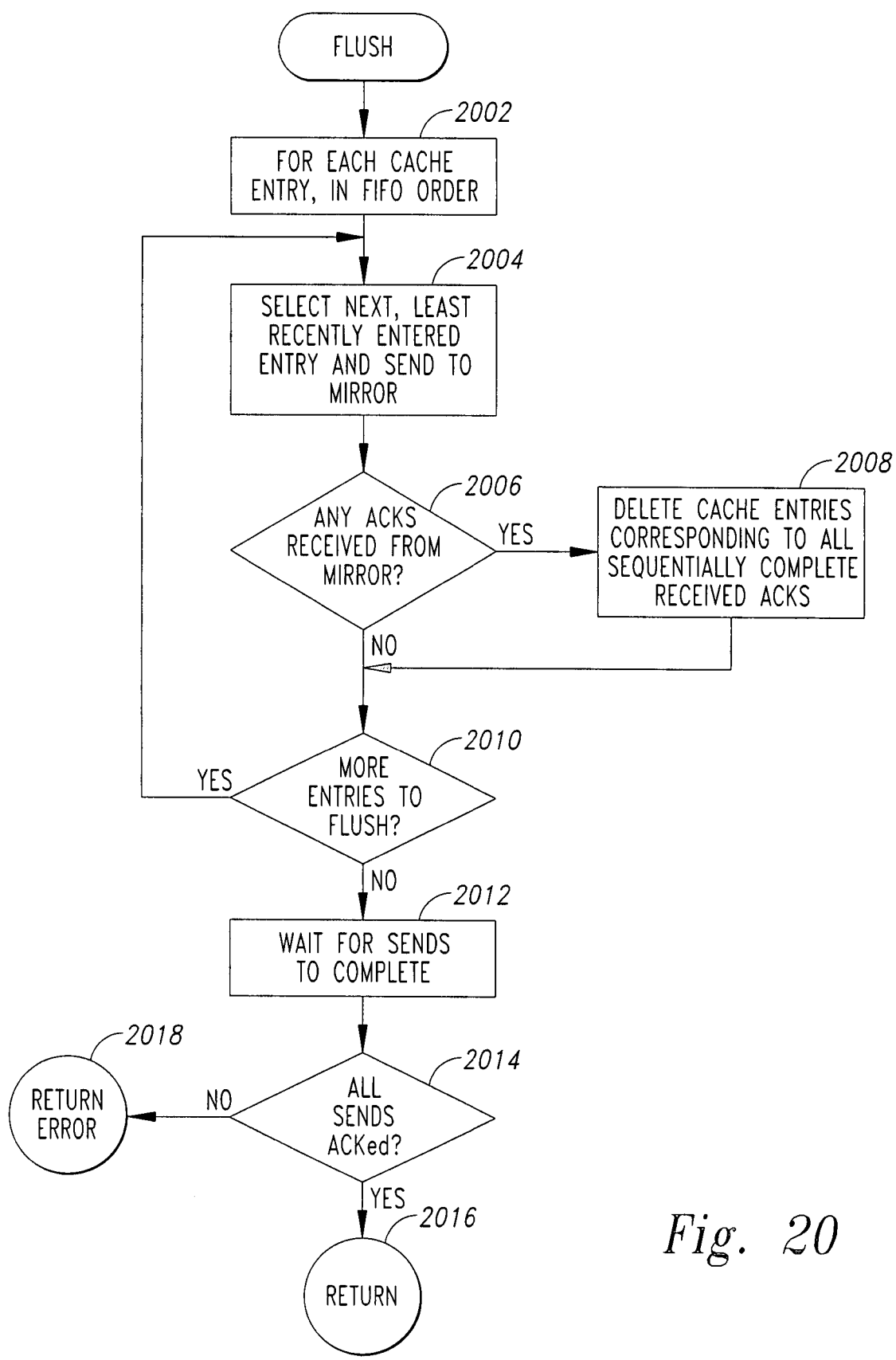
FIG. 20 is a flow-control diagram for the routine "flush," invoked in steps 1904 and 1912 in FIG. 19.

FIG. 20 is a flow-control diagram for the routine "flush," invoked in steps 1904 and 1912 in FIG. 19. Steps 2002-2010 represent a for-loop in which each entry in the time-ordered WRITE-request buffer is selected, in FIFO order, and sent to the remote-mirror LUN. In step 2004, the next, least recently entered WRITE request is extracted from the buffer and sent to the remote-mirror LUN. In step 2006, the routine "flush" determines, by accessing an ACK response queue, whether any acknowledgement messages have been received from the remote-mirror LUN for WRITE requests transferred in step 2004, either in this iteration of the for-loop or in previous iterations. If so, then, in step 2008, the corresponding WRITE requests are deleted from the buffer. Note, however, that a WRITE request cannot be deleted from the buffer until all WRITE requests preceding the WRITE request, in time order, have been deleted. Thus, if an acknowledgement for a WRITE request is received, but the acknowledgement for a previous WRITE has not been received, then the WRITE request is marked for deletion but is not actually deleted. This ensures that a WRITE request is not deleted from the buffer until the routine "flush" knows that all previous WRITE requests have been received by the remote-mirror LUN. After all the WRITE requests have been extracted from the buffer and sent to the remote-mirror LUN, the routine "flush" waits, in step 2012, for acknowledgements for all as yet unacknowledged WRITE requests from the remote-mirror LUN. If all acknowledgments are received within some reasonable time, as detected in step 2014, then "flush" returns successfully in step 2016. Otherwise, "flush" returns an error in step 2018.

Figure 21:
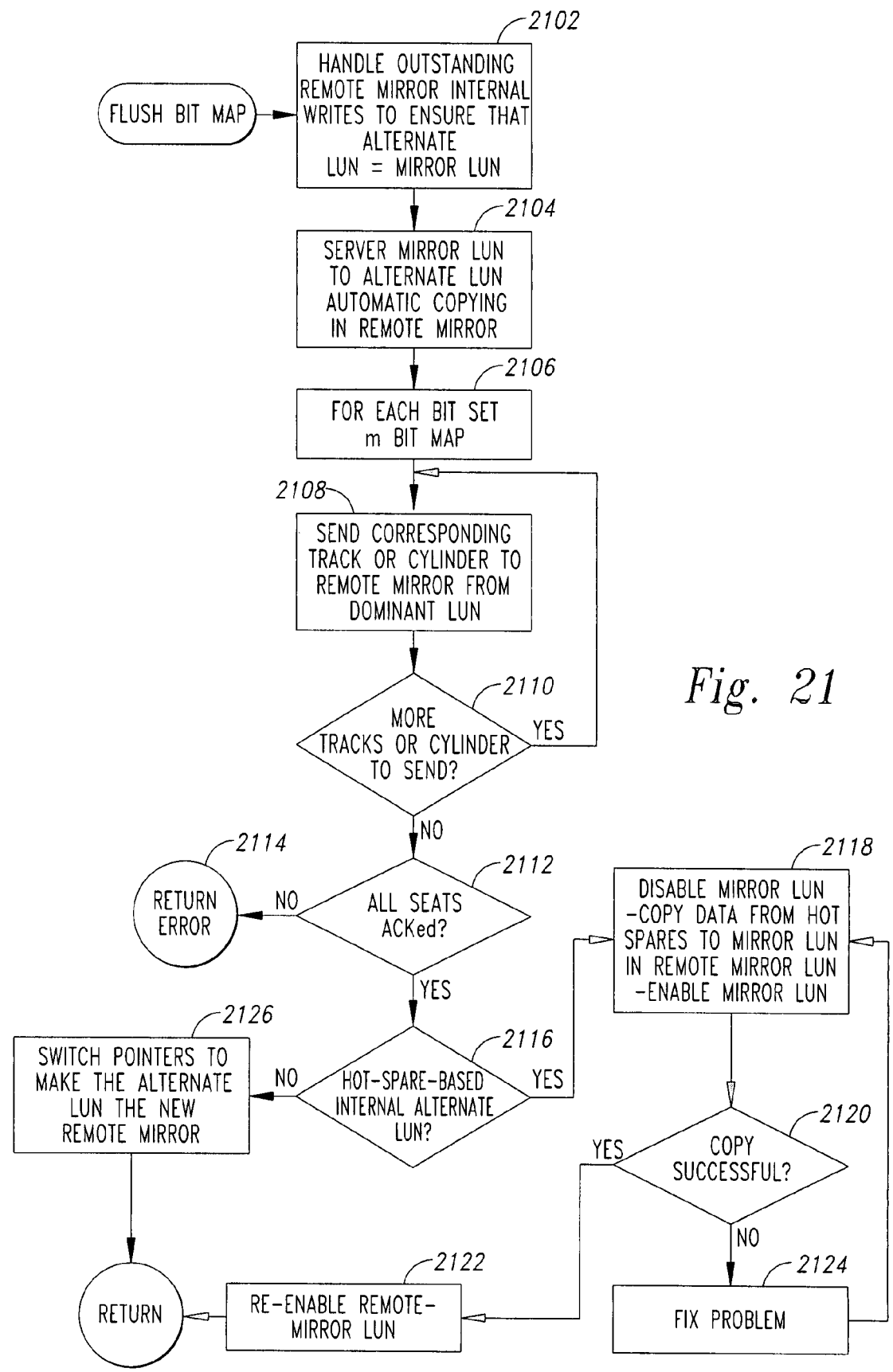
FIG. 21 is a flow-control diagram for the routine "flush bit map," invoked in step 1804 of FIG. 18.

FIG. 21 is a flow-control diagram for the routine "flush bit map," invoked in step 1804 of FIG. 18. In step 2102, all outstanding internal WRITE requests within the mass-storage device providing the remote-mirror LUN are executed to ensure that the alternate LUN has the same data state as the mirror LUN within the mass-storage device providing the remote-mirror LUN. Next, in step 2104, the automatic forwarding of WRITE requests by the mass-storage device providing the remote-mirror LUN to the alternate LUN is discontinued. Then, in the for-loop comprising steps 2106, 2108, and 2110, the dominant LUN sends the track or cylinder corresponding to each bit set in the WRITE-request bit-map buffer to the remote mass-storage device for overriding the corresponding track or cylinder in the alternate LUN. Then, the routine "flush bit map" determines whether all the transmitted tracks or cylinders have been acknowledged by the remote mass-storage device in step 2112. If the transmitted tracks and cylinders have not been acknowledged within a reasonable time, then the routine "flush bit map" returns an error in step 2114. Otherwise, in step 2116, the routine "flush bit map" determines whether a hot-spare-based alternate LUN is employed in the mass-storage device. If so, then the remote mass-storage device is temporarily disabled to enable copying of the data from the hot-spare-based alternate LUN to the remote-mirror LUN, in step 2118, followed by reenablement of the remote-mirror LUN. If the internal copy is successful, as detected in step 2120, then the remote-mirror LUN is reenabled to process forwarded WRITE requests in step 2122. Otherwise, whatever problem prevented a successful copy is addressed, in step 2124, and the copy is again attempted starting with step 2118. If a hot-spare-based alternate LUN is not used on the remote mass-storage device, then the mass-storage device may simply switch LUN pointers to make the alternate LUN the new remote-mirror LUN and to make the previously designated remote-mirror LUN the new alternate LUN, in step 2126.

Although the present invention has been described in terms of a particular embodiment, it is not intended that the invention be limited to this embodiment. Modifications within the spirit of the invention will be apparent to those skilled in the art. For example, an almost limitless number of different controller routines can be devised to construct, maintain, and use hot-spare-based time-ordered WRITE request buffers and alternate LUNs. Similarly, an almost limitless number of different controller routines can be devised to carry out the WRITE request buffering operations, WRITE request forwarding operations, and remote-mirror LUN resynchronization described above. Control logic may be implemented in hardware, firmware, or software. Other available storage space, in addition to hot spare disks, may be employed to extend the time-ordered WRITE request buffer within a mass-storage device.

The foregoing description, for purposes of explanation used specific nomenclature to provide a thorough understanding of the invention. However, it will be apparent to one skilled in the art that the specific details are not required in order to practice the invention. In other instances, well-known portions of disk arrays are shown as diagrams in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments are shown and described in order to best enable others skilled in the art to best utilize the invention and various embodiments with various modifications as are suited to the particular use contemplated. It is intended that the scope of the invention be defined by the following claims and their equivalents.

The invention claimed is:

1. A method for storing WRITE requests in a dominant mass-storage device for later forwarding to a remote mass-storage device that provides mirroring of data stored in the dominant mass-storage device, the method comprising:
   providing a time-ordered WRITE request buffer stored in spare mass-data-storage components within the dominant mass-storage device;
   buffering WRITE requests within the time-ordered WRITE request buffer until the time-ordered WRITE request buffer is filled; and
   when the time-ordered WRITE request buffer is filled, converting the time-ordered WRITE request buffer to a bit-map WRITE request buffer and setting a bit in the bit-map WRITE request buffer for each additional unit of data storage modified by received WRITE requests.

2. The method of claim 1 wherein the spare mass-storage components include data-storage space within hot spare disks of a disk array.

3. The method of claim 1 wherein the mass-storage device is a disk array and wherein the time-ordered WRITE request buffer is stored within both an electronic memory component, used for input queues and other data structures maintained and accessed by a disk-array controller, as well as within data-storage space provided by hot spare disks.

4. The method of claim 3 wherein buffering WRITE requests in the time-ordered WRITE request buffer until the time-ordered WRITE request buffer is filled further includes:
   buffering WRITE requests in a first portion of the time-ordered WRITE request buffer stored in electronic memory until the first portion of the time-ordered WRITE request buffer is filled; and
   buffering WRITE requests in a second portion of the time-ordered WRITE request buffer stored in data-storage space provided by hot spare disks until the second portion of the time-ordered WRITE request buffer is filled.

5. A method for resynchronizing a remote-mirror logical unit provided by a first mass-storage device to a data state equivalent to a dominant logical unit's data state provided by a second mass-storage device, the method comprising:
   providing an alternate remote-mirror logical unit integrated with the first mass-storage device;
   synchronizing the data state of the alternate remote-mirror logical unit to a data state equivalent to the data state of the remote-mirror logical unit;
   synchronizing the alternate remote-mirror logical unit's data state to a data state equivalent to the data state of the dominant logical unit by copying WRITE requests stored in the second mass-storage device to the first mass-storage device and carrying out the WRITE requests on the alternate remote-mirror logical unit; and
   interchanging the alternate remote-mirror logical unit with the remote-mirror logical unit in the second mass-storage device.

6. The method of claim 5 wherein the first and second mass-storage devices are disk arrays and wherein the alternate remote-mirror logical unit comprises additional disks included in the second mass-storage device to serve as the alternate remote-mirror logical unit.

7. The method of claim 6 wherein the first and second mass-storage devices are disk arrays and wherein the alternate remote-mirror logical unit comprises data storage space within hot spare disks in the second mass-storage device.

8. The method of claim 6 wherein the alternate remote-mirror logical unit comprises an auxiliary mass-storage device coupled to the second mass-storage device.

9. The method of claim 6 wherein interchanging the alternate remote-mirror logical unit with the remote-mirror logical unit in the second mass-storage device further comprising modifying a logical-unit-pointer data structure within the second mass-storage device to reference the alternate remote-mirror logical unit.

10. A method for maintaining dominant-logical-unit/remote-mirror-logical-unit data-state consistency despite a communications failure between a first mass-storage device providing a dominant logical unit and a second, remote mass-storage device providing a remote-mirror logical unit, the method comprising:
   providing a time-ordered WRITE request buffer within spare mass-data-storage components of the dominant mass-storage device;
   providing an alternate remote-mirror logical unit integrated with the second mass-storage device;
   buffering WRITE requests within the WRITE request buffer until the time-ordered WRITE request buffer is filled;

when the time-ordered WRITE request buffer is filled, converting the time-ordered WRITE request buffer to a bit-map WRITE request buffer and setting a bit in the bit-map WRITE request buffer for each additional data-storage unit modified by received WRITE requests; and when communications between the first mass-storage device and the second mass-storage device are restored,
synchronizing the alternate remote-mirror logical unit's data state to a data state equivalent to the remote-mirror logical unit's data state,
synchronizing the data state of the alternate remote-mirror logical unit to a data state equivalent to the dominant logical unit's data state by copying WRITE requests stored in the second mass-storage device to the first mass-storage device and carrying out the WRITE requests on the alternate remote-mirror logical unit, and
interchanging the alternate remote-mirror logical unit with the remote-mirror logical unit in the second mass-storage device.

11. A mass-storage device that can be linked with a second mass-storage device to provide a dominant logical unit/remote-mirror logical unit pair, the mass-storage device including:
a WRITE request buffer at least partly stored within mass-storage components of the mass-storage device; and
control logic that receives WRITE requests from remote computers, that queues WRITE requests in memory for execution, that normally forwards WRITE requests to the second mass-storage device, and that, detecting interruption of communications between the mass-storage device and the second mass-storage device, buffers WRITE requests in the WRITE request buffer until communications are restored, after which the control logic forwards the buffered WRITE requests to the second mass-storage device.

12. The mass-storage device of claim 11 wherein the WRITE request buffer is stored in electronic memory and within mass-storage components of the mass-storage device.

13. The mass-storage device of claim 11 wherein the WRITE request buffer is stored completely within mass-storage components of the mass-storage device.

14. The mass-storage device of claim 11 wherein the control logical, after detecting interruption of communications between the mass-storage device and the second mass-storage device, initially buffers WRITE requests in a time-ordered WRITE request buffer.

15. The mass-storage device of claim 14 wherein the control logical, after filling the time-ordered WRITE request buffer with WRITE requests, transforms the time-ordered WRITE request buffer to a bit-map WRITE request buffer, and buffers received WRITE requests in the bit-map WRITE request buffer until communications are restored between the mass-storage device and the second mass-storage device.

16. A mass-storage device that can be linked with a second mass-storage device to provide a dominant logical unit/remote-mirror logical unit pair, the mass-storage device including:
an initial remote-mirror logical unit to which WRITE requests, received and carried out on the second mass-storage device, are transmitted and carried out in order to mirror a dominant logical unit provided by the second mass-storage device; and
an alternate remote-mirror logical unit that, following interruption of communications between the mass-storage device and the second mass-storage device and subsequent restoration of communications, is synchronized to a data state equivalent to the dominant logical unit's data state and then designated as a new remote-mirror logical device that replaces the initial remote-mirror logical unit.

17. The mass-storage device of claim 16 wherein the alternate remote-mirror logical unit is stored within spare mass-storage components within the mass-storage device.

18. The mass-storage device of claim 16 wherein the alternate remote-mirror logical unit is stored within mass-storage components specifically included in the mass-storage device to serve as data storage for the alternate remote-mirror logical unit.

19. The mass-storage device of claim 16 wherein the alternate remote-mirror logical unit is stored within an auxiliary mass-storage device interconnected with the mass-storage device to serve as data storage for the alternate remote-mirror logical unit.

20. The mass-storage device of claim 16 wherein the alternate remote-mirror logical unit is designated as a new remote-mirror logical device by modifying a logical-unit-pointer data structure in an electronic memory component of the mass-storage device.

21. A mass-storage device that can be linked with a second mass-storage device to provide a dominant logical unit/remote-mirror logical unit pair, the mass-storage device including:
an initial remote-mirror logical unit to which WRITE requests, received and carried out on the second mass-storage device, are transmitted and carried out in order to mirror a dominant logical unit provided by the second mass-storage device; and
an alternate remote-mirror logical-unit means that, following interruption of communications between the mass-storage device and the second mass-storage device and subsequent restoration of communications, is synchronized to a data state equivalent to the dominant logical unit's data state and then designated as a new remote-mirror logical device that replaces the initial remote-mirror logical unit.

* * * * *

UNITED STATES PATENT AND TRADEMARK OFFICE
CERTIFICATE OF CORRECTION

PATENT NO. : 7,340,572 B2  Page 1 of 1
APPLICATION NO. : 10/094827
DATED : March 4, 2008
INVENTOR(S) : Robert A. Cochran It is certified that error appears in the above-identified patent and that said Letters Patent is hereby corrected as shown below:

In column 1, line 51, delete "modem" and insert -- modern --, therefor.

In column 1, line 54, delete "modem" and insert -- modern --, therefor.

Signed and Sealed this

Twenty-second Day of July, 2008

JON W. DUDAS
*Director of the United States Patent and Trademark Office*